(12) United States Patent
Bae et al.

(10) Patent No.: US 12,541,993 B2
(45) Date of Patent: Feb. 3, 2026

(54) DISPLAY DEVICE INCLUDING LIGHT RECEIVING ELEMENTS AND METHOD OF OPERATING THE SAME

(71) Applicant: Samsung Display Co., Ltd., Yongin-si (KR)

(72) Inventors: Kwang Soo Bae, Yongin-si (KR); Hyang A Park, Yongin-si (KR); Tae Kyung Ahn, Yongin-si (KR); Hyun Dae Lee, Yongin-si (KR); Kang Bin Jo, Yongin-si (KR); Soo Yeong Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/523,607

(22) Filed: Nov. 29, 2023

(65) Prior Publication Data

US 2024/0290132 A1 Aug. 29, 2024

(30) Foreign Application Priority Data

Feb. 28, 2023 (KR) .......................... 10-2023-0027314

(51) Int. Cl.
*G06V 40/13* (2022.01)
(52) U.S. Cl.
CPC .................................. *G06V 40/1318* (2022.01)
(58) Field of Classification Search
None
See application file for complete search history.

(56) References Cited

U.S. PATENT DOCUMENTS

| | | | |
|---|---|---|---|
| 11,200,399 B1* | 12/2021 | Yang | G06V 40/1318 |
| 2020/0083302 A1* | 3/2020 | Park | H10K 50/828 |
| 2020/0279086 A1* | 9/2020 | Wang | G06V 40/1318 |
| 2020/0394371 A1* | 12/2020 | Chai | G06F 3/0416 |

(Continued)

FOREIGN PATENT DOCUMENTS

| | | |
|---|---|---|
| KR | 10-1923320 B1 | 11/2018 |
| KR | 10-2021-0014559 A | 2/2021 |

OTHER PUBLICATIONS

U.S. Appl. No. 11/422,661 B2, filed Aug. 23, 2022, Yeke Yazdandoost, et al.
U.S. Appl. No. 11/538,846 B2, filed Dec. 27, 2022, Kwon, et al.

*Primary Examiner* — Ming Shui
(74) *Attorney, Agent, or Firm* — Womble Bond Dickinson (US) LLP

(57) ABSTRACT

A display device includes: a base; light emitting element groups on one surface of the base, and each including a plurality of light emitting elements arranged in a first direction; and light receiving element groups on the one surface of the base, and each including a plurality of light receiving elements arranged in the first direction, wherein the light emitting element groups are arranged in a second direction, wherein the light receiving element groups are adjacent and parallel to the light emitting element groups, and wherein, based on a first light emitting element group among the light emitting element groups emitting light, first sensing data is obtained, without emission of a second light emitting element group arranged in the second direction from the first light emitting element group, by using at least one first light receiving element group adjacent to the second light emitting element group.

20 Claims, 21 Drawing Sheets

(56) References Cited

U.S. PATENT DOCUMENTS

| | | | | |
|---|---|---|---|---|
| 2021/0083018 A1* | 3/2021 | Hu | ................. | H01L 31/173 |
| 2021/0157441 A1* | 5/2021 | Chen | ................. | H10K 59/126 |
| 2021/0158751 A1* | 5/2021 | Cha | ................. | H10K 65/00 |
| 2022/0012452 A1* | 1/2022 | Li | ................. | G06F 21/32 |
| 2022/0285460 A1* | 9/2022 | Kim | ................. | H10K 50/865 |
| 2022/0399421 A1* | 12/2022 | Hai | ................. | G06V 10/145 |

* cited by examiner

DISPLAY DEVICE INCLUDING LIGHT RECEIVING ELEMENTS AND METHOD OF OPERATING THE SAME

CROSS-REFERENCE TO RELATED APPLICATION

The present application claims priority to Korean Patent Application No. 10-2023-0027314 filed on Feb. 28, 2023, in the Korean Intellectual Property Office, the entire disclosure of which is incorporated herein in its entirety by reference.

BACKGROUND

1. Field

Aspects of some embodiments of the present disclosure relate to an electronic device.

2. Description of Related Art

Display devices may provide various functions, for example, including displaying images to provide information to users, or sensing input from users, so as to make it possible to organically communicate with users. Recently, the display devices may also include a function of sensing biometric information of users.

Methods of recognizing biometric information may include a capacitive method, which senses a change in capacitance formed between electrodes, an optical method, which uses a light sensor to sense incident light, an ultrasonic method, which uses a piezoelectric element to sense vibration, and the like.

The above information disclosed in this Background section is only for enhancement of understanding of the background and therefore the information discussed in this Background section does not necessarily constitute prior art.

SUMMARY

Aspects of some embodiments of the present disclosure relate to an electronic device, and for example, to a display device including light receiving elements, and a method of operating the display device.

Aspects of some embodiments of the present disclosure are directed to a display device capable of obtaining biometric information of a user with relatively enhanced reliability, and a method of operating the display device.

According to some embodiments of the present disclosure, a display device includes: a base; light emitting element groups on one surface of the base, and each including a plurality of light emitting elements arranged in a first direction; and light receiving element groups on the one surface of the base, and each including a plurality of light receiving elements arranged in the first direction. The light emitting element groups may be arranged in a second direction intersecting the first direction. The light receiving element groups may be respectively adjacent and parallel to the light emitting element groups. When a first light emitting element group among the light emitting element groups emits light, first sensing data may be obtained, without emission of a second light emitting element group arranged in the second direction from the first light emitting element group, by using at least one first light receiving element group adjacent to the second light emitting element group among the light receiving element groups.

According to some embodiments, when the first light emitting element group emits light, a third light emitting element group between the first and the second light emitting element groups among the light emitting element groups may not emit light.

According to some embodiments, when the first light emitting element group emits light, the first sensing data may be obtained by further using a second light receiving element group adjacent to the third light emitting element group.

According to some embodiments, when the first light emitting element group emits light, the first sensing data may be obtained, without emission of two or more third light emitting element groups between the first and the second light emitting element groups among the light emitting element groups, by further using at least one second light receiving element group adjacent to the third light emitting element groups.

According to some embodiments, when the first light emitting element group emits light, a third light emitting element group spaced apart in the second direction from the second light emitting element group among the light emitting element groups may be controlled to emit light.

According to some embodiments, when the first and the third light emitting element groups emit light, the first sensing data may be obtained, without emission of a fourth light emitting element group arranged in the second direction from the third light emitting element group among the light emitting element groups, by further using at least one second light receiving element group adjacent to the fourth light emitting element group among the light receiving element groups.

According to some embodiments, when the second light emitting element group emits light, second sensing data may be obtained by using at least one second light receiving element group adjacent to the first light emitting element group without emission of the first light emitting element group.

According to some embodiments, fingerprint data is generated based on the first sensing data and the second sensing data.

According to some embodiments, the display device may further include: a data driver connected to the plurality of light emitting elements by data lines; a readout circuit connected to the plurality of light receiving elements by readout lines; and a controller configured to control the data driver and obtain the first sensing data and the second sensing data through the readout circuit.

According to some embodiments, the at least one first light receiving element group may include a second light receiving element group arranged adjacent and parallel to the second light emitting element group among the light receiving element groups.

According to some embodiments, the light emitting element groups may be respectively in pixel column areas extending in the first direction. The light receiving element groups may overlap the pixel column areas.

According to some embodiments, the plurality of light emitting elements may include organic light emitting diodes. The plurality of light receiving elements may include organic photodiodes.

Aspects of some embodiments of the present disclosure include a method of driving a display panel including light emitting element groups each including a plurality of light emitting elements arranged in a first direction, and light receiving groups each including a plurality of light receiving elements arranged in the first direction. The method may include: allowing first light emitting element groups spaced apart from each other in a second direction intersecting the first direction among the light emitting element groups to emit light when inhibiting second light emitting element groups between the first light emitting element groups among the light emitting element groups from emitting light; obtaining first sensing data using first light receiving element groups adjacent to the second light emitting element groups among the light receiving element groups when the first light emitting groups emit light; and generating fingerprint data based on the first sensing data.

According to some embodiments, the first light emitting element groups and the second light emitting element groups may be alternately arranged.

According to some embodiments, the method may further include: allowing the second light emitting element groups to emit light when inhibiting the first light emitting element groups from emitting light; and obtaining second sensing data using second light receiving element groups adjacent to the first light emitting element groups among the light receiving element groups when the second light emitting groups emit light.

According to some embodiments, generating the fingerprint data may include generating the fingerprint data further based on the second sensing data.

According to some embodiments of the present disclosure a display device includes: a base; light emitting element groups on one surface of the base, and each including a plurality of light emitting elements arranged in a first direction; and light receiving element groups on the one surface of the base, and each including a plurality of light receiving elements arranged in the first direction. The light emitting element groups may be arranged in a second direction intersecting the first direction. The light receiving element groups may be respectively adjacent and parallel to the light emitting element groups. When first light emitting element groups spaced apart from each other among the light emitting element groups emit light, first sensing data may be obtained, without emission of second light emitting element groups between the first light emitting element groups among the light emitting element groups, by using first light receiving element groups adjacent to the second light emitting element groups among the light receiving element groups.

According to some embodiments, the first light emitting element groups and the second light emitting element groups may be alternately arranged.

According to some embodiments, when the second light emitting element groups emit light, the first light emitting element groups may not emit light, and second sensing data may be obtained by using second light receiving element groups adjacent to the first light emitting element groups.

According to some embodiments, fingerprint data may be generated based on the first sensing data and the second sensing data.

DETAILED DESCRIPTION

Figure 1:
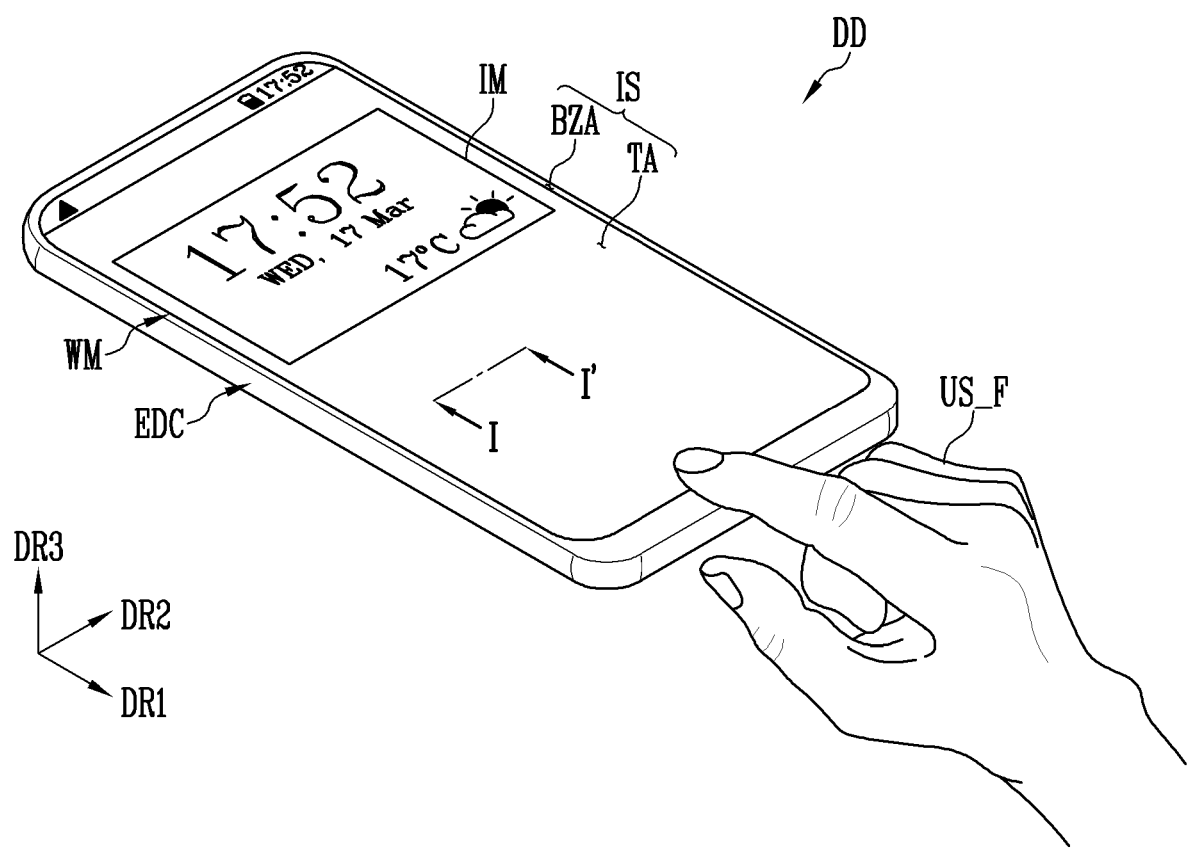
FIG. 1 is a perspective view illustrating a display device according to some embodiments of the present disclosure.

Hereinafter, aspects of some embodiments of the present disclosure will be described in more detail with reference to the attached drawings. In the following description, only parts required for understanding of operations in accordance with the present disclosure will be described, and explanation of the other parts will be omitted not to make the gist of the present disclosure unclear. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

It will be understood that when an element is referred to as being "coupled" or "connected" to another element, it can be directly coupled or connected to the other element or intervening elements may be present therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element or feature's relationship to another element(s) or feature(s), as illustrated in the drawings. Spatially relative terms are intended to encompass different orientations of an apparatus in use, operation, and/or manufacture in addition to the orientation depicted in the drawings. For example, if the device in the drawings is turned upside down, elements described as "below" or "beneath" other elements or features would then be oriented "above" the other elements or features. Thus, the term "below" can encompass both an orientation of above and below. Furthermore, the device may be otherwise oriented (e.g., rotated 90 degrees or at other orientations), and, as such, the spatially relative descriptors used herein interpreted accordingly.

Herein, various embodiments will be described with reference to drawings that are schematic illustrations of idealized embodiments. As such, variations from the shapes of the illustrations as a result, for example, of manufacturing techniques and/or tolerances, are to be expected. Therefore, embodiments disclosed herein should not be construed as limited to the particular illustrated shapes of regions, but are to include deviations in shapes that result from, for instance, manufacturing. As such, the shapes illustrated in the drawings may not illustrate the actual shapes of regions of a device, and, as such, are not intended to be limiting.

Figure 2:
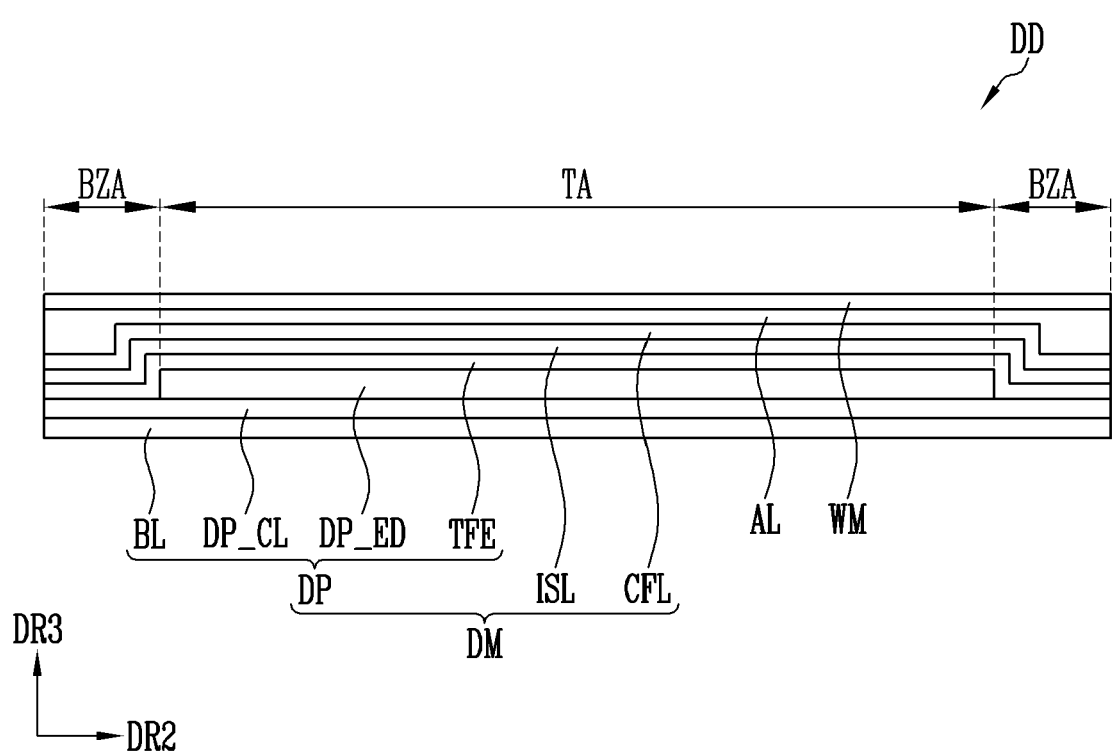
FIG. 2 is a sectional view taken along the line I-I' of FIG. 1.

FIG. 1 is a perspective view illustrating aspects of a display device DD according to some embodiments of the present disclosure. FIG. 2 is a sectional view taken along the line I-I' of FIG. 1.

Referring to FIG. 1, the display device DD may have a rectangular shape including long sides which are parallel to a first direction DR1, and short sides which area parallel to a second direction DR2 intersecting the first direction DR1. However, embodiments of the display device DD are not limited to the foregoing, and may have various shapes according to the design of the display device DD such as a generally rectangular shape with rounded corners, a square shape, a circular shape, elliptical shape, a polygonal shape, and the like.

An upper surface of the display device DD may be defined as a display surface IS, and may have a planar surface parallel to a plane defined by the first direction DR1 and the second direction DR2. Images IM generated from the display device DD may be provided to a user through the display surface IS (e.g., in a direction perpendicular or normal with respect to the display surface, or in the third direction DR3).

The display surface IS may be divided into a transmission area TA and a bezel area BZA. The transmission area TA may be an area at which the images IM are displayed. The user may see the images IM through the transmission area TA. In FIG. 1, the transmission area TA is illustrated as having a rectangular shape with rounded corners. However, the shape of the transmission area TA is not limited to the foregoing, and may have any one of various shapes.

The bezel area BZA may enclose (e.g., surround) the transmission area TA. The transmission area TA may be defined by the bezel area BZA. That is, the bezel area BZA may be located in a periphery or outside a footprint of the transmission area.

The display device DD may sense a user input applied from the outside. The user input may include various types of inputs provided from the outside of the display device DD. For example, the user input may include a touch input from a part of the body of the user (e.g., a finger US_F of the user), or a hovering input which occurs when being close or in proximity to the display device DD without making a touch.

The display device DD may sense the biometric information of the user that is applied thereto from the outside. An area (hereinafter, a biometric information sensing area) capable of sensing the biometric information of the user may be provided in the display surface IS of the display device DD. The biometric information sensing area may be provided to the entirety of the transmission area TA. Alternatively, the biometric information sensing area may be partially provided to the transmission area TA. The display device DD may include light sensors in the biometric information sensing area, and generate the biometric information of the user using the light sensors.

The display device DD may include a window WM and a housing EDC. The window WM and the housing EDC may be coupled to each other, thus forming the appearance of the display device DD.

A front surface of the window WM may define the display surface IS of the display device DD. The window WM may include an optically transparent insulating material. For example, the window WM may include glass or plastic. The window WM may have a single-layer structure or a multi-layer structure. For example, the window WM may include plastic films coupled to each other by an adhesive, or may include a glass layer and a plastic film coupled to each other by an adhesive.

Referring to FIG. 2, a display module DM may be located under the window WM. The display module DM may include a display panel DP and an input sensing layer ISL. The display panel DP may be configured to display images (e.g., at the transmission area TA). The input sensing layer ISL may be configured to sense the user input applied thereto from the outside.

According to some embodiments, the display panel DP may be an emission type display panel. For example, the display panel DP may be an organic light emitting display panel, an inorganic light emitting display panel, or a quantum dot light emitting display panel. An emission layer of the organic light emitting display panel may include organic light emitting material. An emission layer of the inorganic light emitting display panel may include inorganic light emitting material. An emission layer of the quantum dot light emitting display panel may include quantum dots, quantum rods, or the like. Hereinafter, aspects of some embodiments will be described in more detail based on the case where the display panel DP is an organic light emitting display panel.

The display panel DP may include a base layer BL, a circuit layer DP_CL, an element layer DP_ED, and an encapsulation layer TFE. The display panel DP may be a flexible display panel. For example, the display panel DP may include a foldable display panel. Alternatively, the display panel DP may be a rigid display panel.

The base layer BL may include a synthetic resin layer. The synthetic resin layer may be a polyimide-based resin layer, and the material thereof is not limited to a particular material. The base layer BL may include a glass substrate, a metal substrate, an organic/inorganic composite material substrate, or the like.

The circuit layer DP_CL may be located on the base layer BL. The circuit layer DP_CL may include at least one insulating layer, and circuit elements. Hereinafter, the insulating layer included in the circuit layer DP-CL will be referred to as an intermediate insulating layer. The intermediate insulating layer includes at least one intermediate inorganic layer and at least one intermediate organic layer. The circuit elements may include a pixel circuit included in each of pixels configured to display an image, and may include a sensor circuit included in each of sensors configured to sense biometric information. For example, the biometric information may be the fingerprint of the finger US_F of the user of FIG. 1. Each of the sensors may be a light sensor configured to sense light transmitted from the user input. The circuit layer DP_CL may further include signal lines connected to the pixel circuit and the sensor circuit.

The element layer DP_ED may include a light emitting element included in each of the pixels, and a light receiving element included in each of the sensors. According to some embodiments, the light receiving element may be an organic photodiode. The light receiving elements may sense light reflected by the fingerprint of the finger US_F of the user.

The encapsulation layer TFE may encapsulate the element layer DP_ED. The encapsulation layer TFE may include at least one organic layer and at least one inorganic layer. The inorganic layer may include inorganic material, and protect the element layer DP_ED from water/oxygen. The encapsulation inorganic layer may include a silicon nitride layer, silicon oxynitride layer, a silicon oxide layer, a titanium oxide layer, or an aluminum oxide layer, and is not limited thereto. The organic layer includes organic material, and may protect the element layer DP_ED from foreign substances such as dust particles.

The input sensing layer ISL may be located on the display panel DP. The input sensing layer ISL may be directly located on the encapsulation layer TFE. In this case, the input sensing layer ISL may be formed on the display panel DP through a continuous process. For example, in the case where the input sensing layer ISL is directly located on the display panel DP, an adhesive film may not be located between the input sensing layer ISL and the encapsulation layer TFE. Alternatively, an adhesive film may be located between the input sensing layer ISL and the display panel DP. In this case, the input sensing layer ISL and the display panel DP may not be fabricated through a continuous process. The input sensing layer ISL may be fabricated through a separate process from the display panel DP, and then bonded to an upper surface of the display panel DP by the adhesive film.

The input sensing layer ISL may include a plurality of electrodes configured to be utilized to sense an input from the user (e.g., a touch of the user) and generate input signals. According to some embodiments, the electrodes may sense an external input in a capacitive manner.

The display module DM may further include a color filter layer CFL located on the element layer DP_ED. According to some embodiments, the color filter layer CFL may be located on the input sensing layer ISL. However, embodiments according to the present disclosure are not limited the foregoing. For example, the color filter layer CFL may be located between the display panel DP and the input sensing layer ISL. The color filter layer CFL may include color filters.

The window WM may be located on the color filter layer CFL. The window WM may be attached to the color filter layer CFL by an adhesive layer AL. The adhesive layer AL may include optical clear adhesive, optically clear adhesive resin, or pressure sensitive adhesive (PSA).

Referring again to FIG. 1, the housing EDC is coupled with the window WM. The housing EDC may be coupled with the window WM to provide internal space. The display module DM of FIG. 2 may be received in the internal space. The housing EDC may include material having relatively high rigidity. For example, the housing EDC may include glass, plastic, or metal, or may include one or more frames and/or plates formed of a combination of glass, plastic, and metal. The housing EDC may be configured to protect components of the display device DD that are received in the internal space from external shocks. A battery or the like for the supply of power needed to operate the display device DD may be located between the display module DM and the housing EDC.

According to some embodiments, the display device DD may include at least one among various electronic devices. For example, the display device DD may be applied to any one of electronic devices such as a smart watch, a tablet PC, a notebook computer, a computer, and a smart television.

Figure 3:
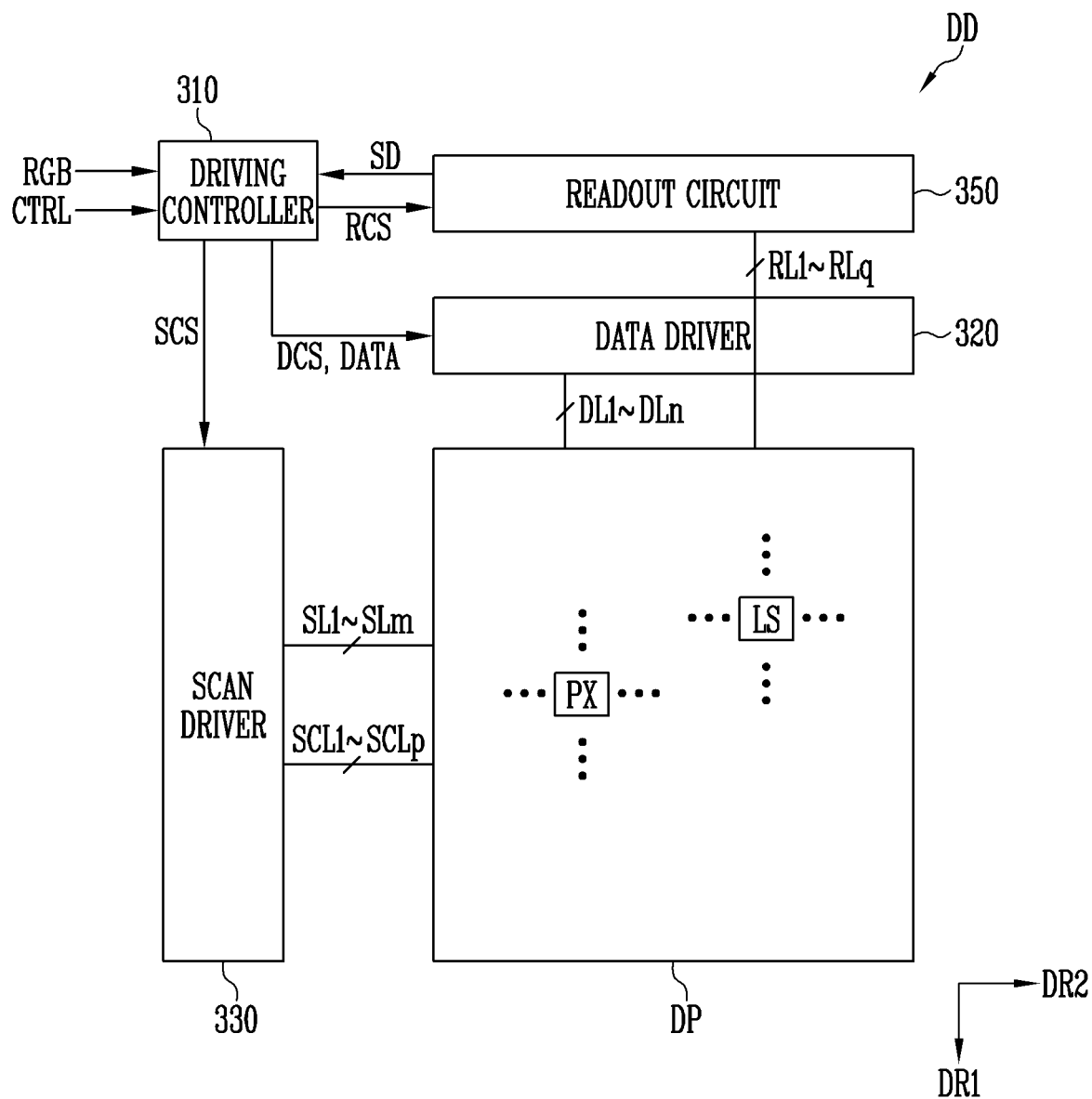
FIG. 3 is a block diagram illustrating further details of the display device of FIG. 1 according to some embodiments of the present disclosure.
Figure 4:
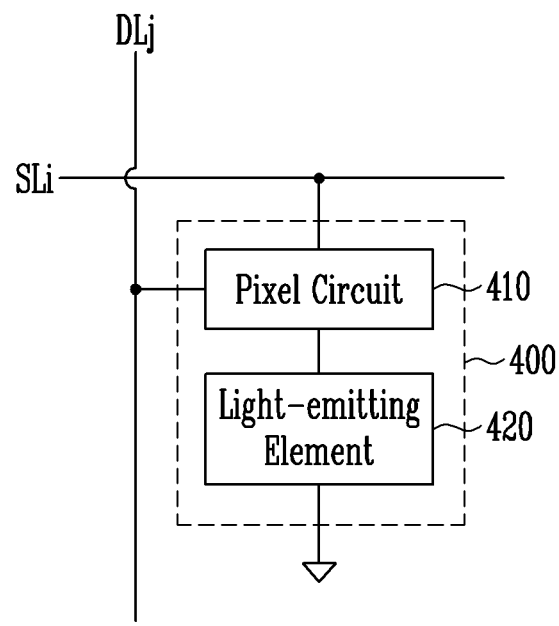
FIG. 4 is a block diagram illustrating further details of a pixel of FIG. 3 according to some embodiments of the present disclosure.
Figure 5:
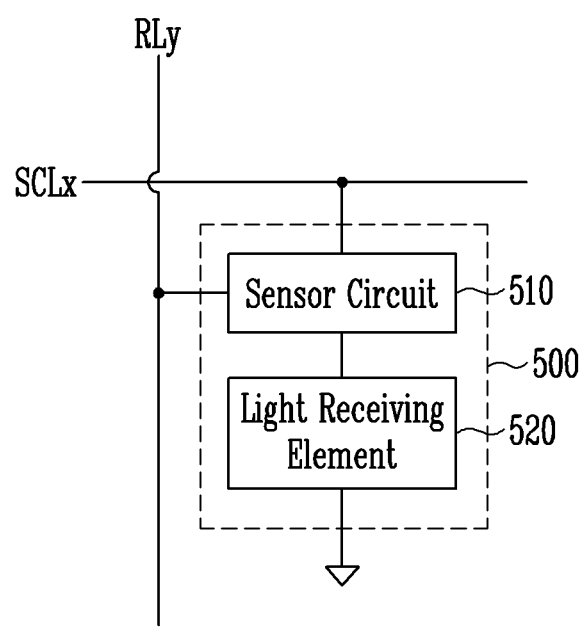
FIG. 5 is a block diagram illustrating further details of a light sensor of FIG. 3 according to some embodiments of the present disclosure.

FIG. 3 is a block diagram illustrating aspects of the display device DD of FIG. 1 according to some embodiments. FIG. 4 is a block diagram illustrating aspects of a pixel PX of FIG. 3 according to some embodiments. FIG. 5 is a block diagram illustrating aspects of a light sensor of FIG. 3, according to some embodiments.

Referring to FIG. 3, the display device DD may include a display panel DP, a panel driver, and a driving controller 310. According to some embodiments, the panel driver may include a data driver 320, a scan driver 330, and a readout circuit 350.

The driving controller 310 may receive an image signal RGB and a control signal CTRL. The driving controller 310 is configured to generate an image data signal DATA obtained by converting a data format of the image signal RGB to a format suitable for interface with the data driver 320. The driving controller 310 may output a first control signal SCS, a second control signal DCS, and a third control signal RCS.

The display panel DP may include a plurality of pixels PX and a plurality of sensors LS. The plurality of pixels PX and the plurality of sensors LS may be arranged in the first direction DR1 and the second direction DR2.

The plurality of pixels PX may be electrically connected to scan lines SL1 to SLm and data lines DL1 to DLn. FIG. 4 illustrates a pixel 400 located on an i-th row and a j-th column among the plurality of pixels PX (i is a positive integer less than or equal to m, and j is a positive integer less than or equal to n). Referring to FIG. 4, the pixel 400 may include a pixel circuit 410, and a light emitting element 420 configured to emit light under control of the pixel circuit 410. The pixel circuit 410 is connected to an i-th scan line SLi and a j-th data line DLj, and may control the light emitting element 420 to emit light in response to signals received from the i-th scan line SLi and the j-th data line DLj. According to some embodiments, the light emitting element 420 may include an organic light emitting diode.

Referring again to FIG. 3, the plurality of sensors LS may be respectively electrically connected to sensing control lines SCL1 to SCLp and readout lines RL1 to RLq. FIG. 5 illustrates a sensor 500 located on an x-th row and a y-th column among the plurality of sensors LS (x is a positive integer less than or equal to p, and y is a positive integer less than or equal to q). Referring to FIG. 5, the sensor 500 may include a sensor circuit 510, and a light receiving element 520 configured to sense light. The sensor circuit 510 is connected to an x-th sensing control line SCLx and a y-th readout line RLy. The sensor circuit 510 may output voltage and/or current corresponding to light sensed by the light receiving element 520 to the y-th readout line RLy, in response to a signal received from the x-th sensing control line SCLx. According to some embodiments, the light receiving element 520 may include an organic photodiode.

Referring again to FIG. 3, at least some of the scan lines SL1 to SLm may be used as the sensing control lines SCL1~SCLp. For example, each pixel circuit may be connected to two or more scan lines. In this case, any one of the corresponding scan lines may be provided as a sensing control line connected to sensor circuits located on the same row or adjacent rows. For example, the sensing control line may include at least one of an initialization scan line or a compensation scan line.

The data driver 320 may receive a second control signal DCS and an image data signal DATA from the driving controller 310. The data driver 320 may convert the image data signal DATA to data signals, and output the data signals to the data lines DL1 to DLn. The data signals may be analog voltages corresponding to grayscale values of the image data signal DATA.

The scan driver 330 may receive a first control signal SCS from the driving controller 310. For example, the first control signal SCS may include a start signal and clock signals. The scan driver 330 may output scan signals to the scan lines SL1 to SLm in response to the first control signal SCS.

Hence, the pixels PX that receive respective scan signals may receive analog voltages having grayscale values corresponding to the image data signal DATA, so that the pixels PX may output light having luminance corresponding to the analog voltages. Hence, an image is displayed on the display panel DP.

The readout circuit 350 may receive a third control signal RCS from the driving controller 310. The readout circuit 350 may be operated in response to a third control signal RCS. The readout circuit 350 may receive sensing signals through the readout lines RL1 to RLq from the sensors LS. The readout circuit 350 may process the received sensing signals and generate sensing data SD, and may provide the generated sensing data SD to the driving controller 310. The driving controller 310 may generate biometric information such as fingerprint data of the user, based on the sensing data SD.

According to some embodiments, the display device DD may further include a voltage generator configured to generate voltages needed for operations of the display panel DP and other components of the display device DD.

Figure 6:
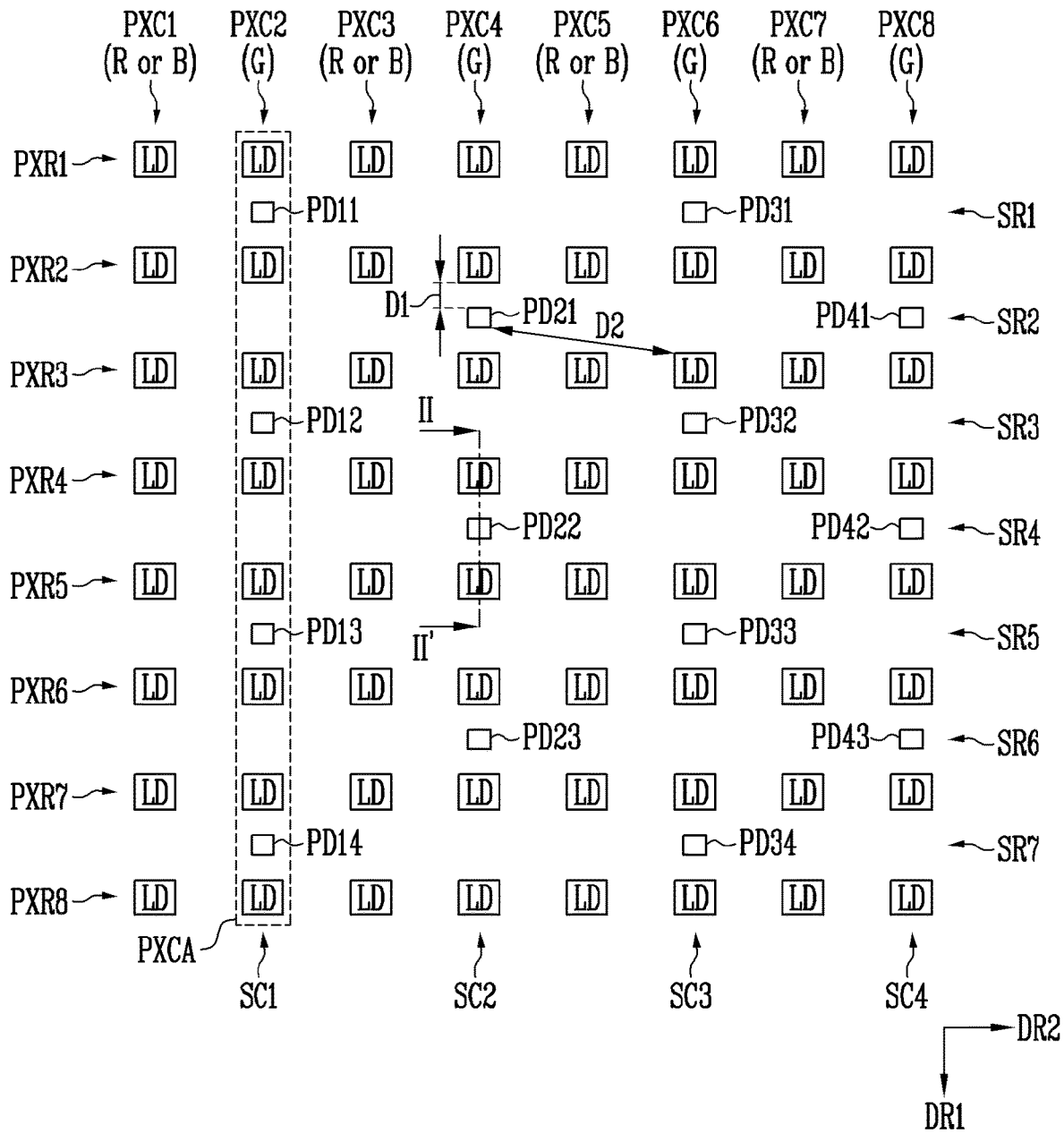
FIG. 6 is a plan view illustrating an arrangement of light emitting elements of pixels and light receiving elements of sensors in the display device of FIG. 3 according to some embodiments of the present disclosure.

FIG. 6 is a plan view illustrating an example arrangement of the light emitting elements LD of the pixels and the light receiving elements of the sensors in the display device of FIG. 3 according to some embodiments.

Referring to FIG. 6, the light emitting elements LD and the light receiving elements are arranged. The light emitting elements LD may be arranged on pixel rows PXR1 to PXR8 and pixel columns PXC1 to PXC8. FIG. 6 illustrates eight pixel rows PXR1 to PXR8 and eight pixel columns PXC1 to PXC8. However, the foregoing example is for providing clear description, and embodiments according to the present disclosure are not limited thereto. The numbers of pixel rows and pixel columns included in the display panel DP may be increased. According to some embodiments, each of the light emitting elements LD may include an organic light emitting diode.

The first to eighth pixel rows PXR1 to PXR8 may be arranged in the first direction DR1. Each of the first to eighth pixel rows PXR1 to PXR8 may extend in the second direction DR2. The first to eighth pixel columns PXC1 to PXC8 may be arranged in the second direction DR2. Each of the first to eighth pixel columns PXC1 to PXC8 may extend in the first direction DR1.

According to some embodiments, light emitting elements LD configured to generate light of green (G) may be arranged on even-numbered pixel columns PXC2, PXC4, PXC6, and PXC8. In this case, light emitting elements LD configured to generate light of red (R) and light emitting elements LD configured to generate light of blue (B) may be arranged on odd-numbered pixel columns PXC1, PXC3, PXC5, and PXC7. For example, the light emitting elements LD configured to generate light of red (R) and the light emitting elements LD configured to generate light of blue (B) may be alternately arranged on each of the odd-numbered pixel columns PXC1, PXC3, PXC5, and PXC7.

The light receiving elements may be arranged on the sensor rows SR1 to SR7 and the sensor columns SC1 to SC4. FIG. 6 illustrates seven sensor rows SR1 to SR7 and four sensor columns SC1 to SC4. However, the foregoing example is for providing clear description. The numbers of sensor rows and sensor columns included in the display panel DP may be increased.

The first to seventh sensor rows SR1 to SR7 may be arranged in the first direction DR1. Each of the first to seventh pixel sensor rows SR1 to SR7 may extend in the second direction DR2. The first to fourth sensor columns SC1 to SC4 may be arranged in the second direction DR2. Each of the first to fourth sensor columns SC1 to SC4 may extend in the first direction DR1.

The first to fourth sensor columns SC1 to SC4 may be located adjacent and parallel to some pixel columns of the first to eighth pixel columns PXC1 to PXC8. According to some embodiments, the first to fourth sensor columns SC1 to SC4 may be respectively located adjacent and parallel to the even-numbered pixel columns PXC2, PXC4, PXC6, and PXC8. For example, each of the pixel columns PXC1 to PXC8 may be defined as being located in a pixel column area PXCA extending in the first direction DR1. In this case, each of the first to fourth sensor columns SC1 to SC4 may overlap the pixel column area PXCA of the corresponding even-numbered pixel columns.

Unlike the case illustrated in FIG. 6, the first to fourth sensor columns SC1 to SC4 may be respectively located adjacent and parallel to the odd-numbered pixel columns PXC1, PXC3, PXC5, and PXC7.

According to some embodiments, light receiving elements PD11 to PD14 may be arranged on the odd-numbered sensor rows SR1, SR3, SR5, and SR7 in the first sensor column SC1. Light receiving elements PD21 to PD23 may be arranged on the even-numbered sensor rows SR2, SR4, and SR6 in the second sensor column SC2. Light receiving elements PD31 to PD34 may be arranged on the odd-numbered sensor rows SR1, SR3, SR5, and SR7 in the third sensor column SC3. Light receiving elements PD41 to PD43 may be arranged on the even-numbered sensor rows SR2, SR4, and SR6 in the fourth sensor column SC4. In addition, the light receiving elements may be arranged on each of the first to fourth sensor columns SC1 to SC4 in various ways. According to some embodiments, each of the light receiving elements PD11 to PD14, PD21 to PD23, PD31 to PD34, and PD41 to PD43 may include an organic photodiode.

A first distance D1 between a light receiving element (e.g., PD21) and an adjacent light emitting element in the corresponding pixel column (e.g., PXC4) is relatively small. A second distance D2 between a light receiving element (e.g., PD21) and a light emitting element in a pixel column (e.g. PXC6) of green (G) adjacent to the corresponding pixel column is greater than the first distance D1. As such, each light receiving element is located relatively close to a light emitting element in the corresponding pixel column.

Figure 7:
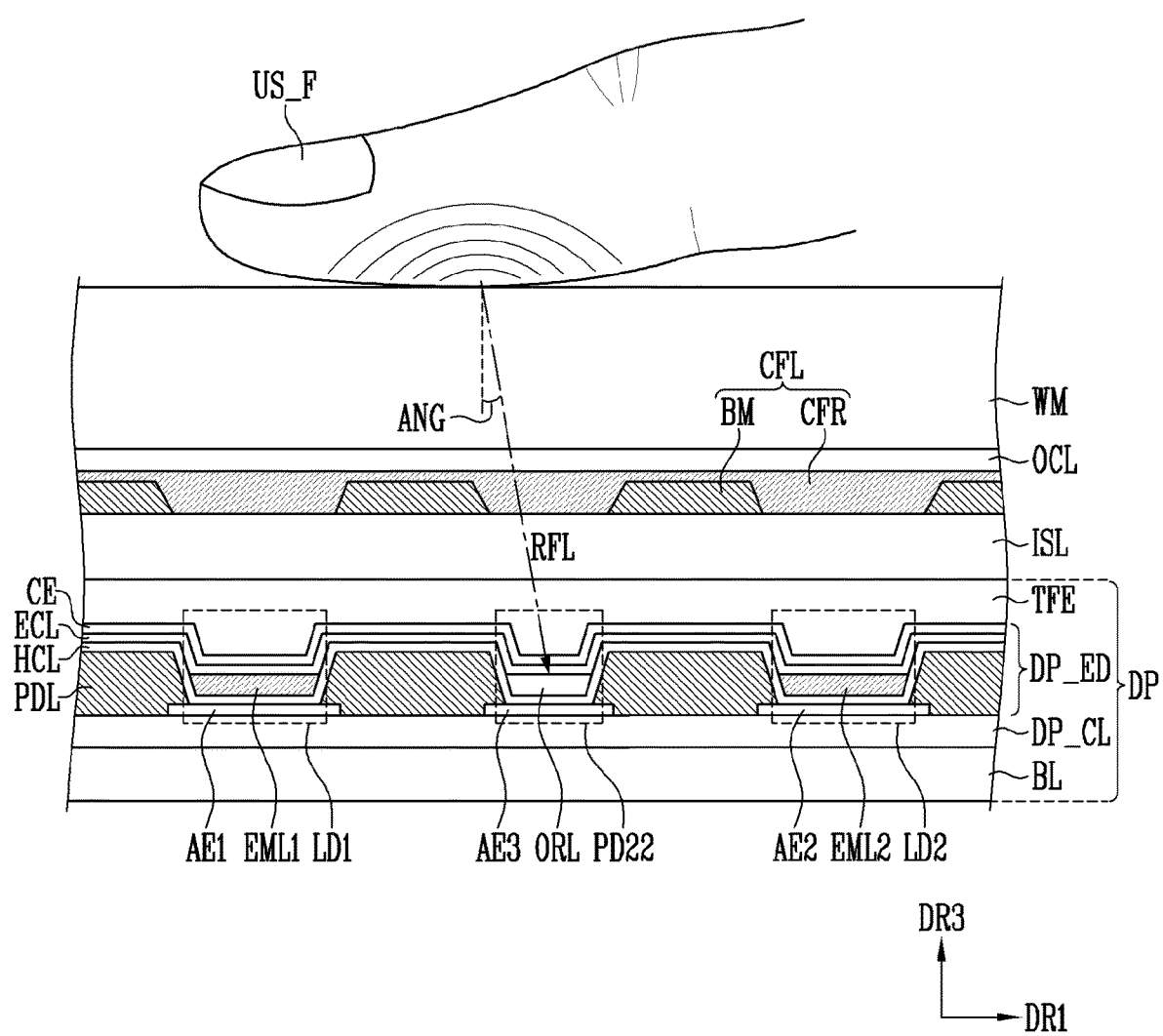
FIG. 7 is a sectional view of the display device taken along the line II-II' of FIG. 6.

FIG. 7 is a sectional view of the display device taken along the line II-II' of FIG. 6.

Referring to FIGS. 6 and 7, the display panel DP may include a base layer BL, a circuit layer DP_CL, an element layer DP_ED, and an encapsulation layer TFE.

The base layer BL may include a synthetic resin layer. The synthetic resin layer may include thermosetting resin. Particularly, the synthetic resin layer may be a polyimide-based resin layer, and the material thereof is not limited to a specific material. The synthetic resin layer may include at least one of acrylic resin, methacrylic resin, polyisoprene, vinyl-based resin, epoxy-based resin, urethane-based resin, cellulose-based resin, siloxane-based resin, polyamide-based resin, or perylene-based resin. Furthermore, the base layer may include a glass substrate, a metal substrate, an organic/inorganic composite material substrate, or the like.

The circuit layer DP_CL may be located on the base layer BL. The circuit layer DP_CL may include a plurality of insulating layers, and conductive layers and semiconductor layers which are located between the insulating layers. The circuit layer DP_CL may include a circuit configured to control the element layer DP_ED. According to some embodiments, the circuit layer DP_CL may include a pixel circuit 410 (refer to FIG. 4) of each pixel, and a sensor circuit 510 (refer to FIG. 5) of each sensor.

The element layer DP_ED may be located on the circuit layer DP_CL. The element layer DP_ED may include light emitting elements and light receiving elements. According to some embodiments, the element layer DP_ED may include a light emitting element 420 (refer to FIG. 4) of each pixel, and a light receiving element 520 (refer to FIG. 5) of each sensor.

A first electrode layer is located on the circuit layer DP_CL. The first electrode layer may include first to third anodes AE1 to AE3. A pixel defining layer PDL is formed on the first electrode layer. The pixel defining layer PDL may include openings through which portions of the first to third anodes AE1 to AE3 are exposed. The openings of the pixel defining layer PDL may be understood as defining light emitting areas of the light emitting elements LD and light receiving areas of the light receiving elements PD11 to PD14, PD21 to PD23, PD31 to PD34, and PD41 to PD43.

According to some embodiments, the pixel defining layer PDL may include black material. The pixel defining layer PDL may further include black organic dye/pigment such as carbon black or aniline black. The pixel defining layer PDL may be formed of a combination of blue organic material and black organic material. The pixel defining layer PDL may include liquid-repellent organic material.

A hole control layer HCL may be located on the entirety of the pixel defining layer PDL. The hole control layer HCL may be located in common over the first to third anodes AE1 to AE3. The hole control layer HCL may include a hole transport layer and a hole injection layer.

Located on the hole control layer HCL, a first emission layer EML1, a second emission layer EML2, and a photoelectric conversion layer ORL may respectively overlap the first to third anodes AE1, AE2, and AE3.

Each of the first and second emission layers EML1 and EML2 may include organic material and/or inorganic material. Each of the first and second emission layers EML1 and EML2 may generate colored light. Each of the first and second emission layers EML1 and EML2 may be configured to generate light of any one of red (R), blue (B), and green (G). For example, the first and second emission layers EML1 and EML2 may generate light of green (G).

The photoelectric conversion layer ORL may include organic photo-sensing material. The photoelectric conversion layer ORL may sense light that is incident thereon, and generate charges. Charges generated from the photoelectric conversion layer ORL may change an electric field between the third anode AE3 and a cathode CE. The amount of charges generated from the photoelectric conversion layer ORL may vary depending on whether light is incident on a corresponding sensor, the intensity of light that is incident on the corresponding sensor, or the like. Accordingly, the electric field formed between the third anode AE3 and the cathode CE may be changed. The corresponding sensor circuit may generate a sensing signal in response to a change in electric field between the third anode AE3 and the cathode CE.

According to some embodiments, each of the sensors LS of FIG. 3 may include a photo-transistor having the photoelectric conversion layer ORL as an active layer. Here, each of the sensors LS may sense current flowing through the photo-transistor and obtain fingerprint information. As such, each of the sensors LS may include various photoelectric conversion elements capable of generating an electrical signal in response to a change in quantity of light.

An electron control layer ECL is located on the first and second emission layers EML1 and EML2 and the photoelectric conversion layer ORL. The electron control layer ECL may include an electron transport layer and an electron injection layer. The cathode CE is located on the electron control layer ECL. The electron control layer ECL and the cathode CE may be formed in common on the first and second emission layers EML1 and EML2 and the photoelectric conversion layer ORL.

The first anode AE1, the first emission layer EML1, a portion of the hole control layer HCL that overlaps the first emission layer EML1, a portion of the electron control layer ECL that overlaps the first emission layer EML1, and a portion of the cathode CE that overlaps the first emission layer EML1 may form a first light emitting element LD1. Furthermore, the second anode AE2, the second emission layer EML2, a portion of the hole control layer HCL that overlaps the second emission layer EML2, a portion of the electron control layer ECL that overlaps the second emission layer EML2, and a portion of the cathode CE that overlaps the second emission layer EML2 may form a second light emitting element LD2.

The third anode AE3, the photoelectric conversion layer ORL, a portion of the hole control layer HCL that overlaps the photoelectric conversion layer ORL, a portion of the electron control layer ECL that overlaps the photoelectric conversion layer ORL, and a portion of the cathode CE that overlaps the photoelectric conversion layer ORL may form a light receiving element PD22.

The light receiving elements PD11 to PD14, PD21 to PD23, PD31 to PD34, and PD41 to PD43 of FIG. 6 may be configured to sense light of a specific color. For example, the light receiving elements PD11 to PD14, PD21 to PD23, PD31 to PD34, and PD41 to PD43 may sense light of green (G) and generate sensing signals. For example, as described below, a green color filter CFR may overlap the top of each of the light receiving elements PD11 to PD14, PD21 to PD23, PD31 to PD34, and PD41 to PD43. However, embodiments according to the present disclosure are not limited to the foregoing. For example, the light receiving elements PD11 to PD14, PD21 to PD23, PD31 to PD34, and PD41 to PD43 may sense light of other colors and generate sensing signals. Hereinafter, for convenience of explanation, it is assumed that the light receiving elements PD11 to PD14, PD21 to PD23, PD31 to PD34, and PD41 to PD43 may sense light of green (G). In this case, light emitting elements LD that generate light of green (G) among the light emitting elements LD may be used as light sources for the light receiving elements PD11 to PD14, PD21 to PD23, PD31 to PD34, and PD41 to PD43.

The encapsulation layer TFE is located on the element layer DP_ED. The encapsulation layer TFE may include an inorganic layer and/or an organic layer. For example, the encapsulation layer TFE may include two inorganic layers, and an organic layer located between the two inorganic layers. As another example, the encapsulation layer TFE may include inorganic layers and organic layers which are alternately stacked.

The inorganic layer of the encapsulation layer TFE may protect the element layer DP_ED from water/oxygen. The organic layer of the encapsulation layer TFE may protect the element layer DP_ED from foreign substances such as dust particles. The inorganic layer of the encapsulation layer TFE may include a silicon nitride layer, a silicon oxynitride layer, a silicon oxide layer, a titanium oxide layer, or an aluminum oxide layer, and is not limited thereto. The organic layer of the encapsulation layer TFE may include an acrylic organic layer, and is not limited thereto.

The input sensing layer ISL may be located over the encapsulation layer TFE. The color filter layer CFL may be located on the input sensing layer ISL. The color filter layer CFL may include color filters which respectively overlap the light emitting elements LD of FIG. 6. Each of the color filters is configured to allow light of a color corresponding to the related light emitting element to selectively pass therethrough. For example, the color filter layer CFL may include a green color filter CFR which overlaps the first and second light emitting elements LD1 and LD2.

The color filter layer CFL may further include a color filter which overlaps the light receiving element PD22. The color filter that overlaps the light receiving element PD22 may be configured to allow light of a color suitable for being sensed by the light receiving element PD22 to selectively pass therethrough. According to some embodiments, the color filter layer CFL may further include a green color filter CFR which overlaps the light receiving element PD22.

The color filter layer CFL may further include a black matrix BM. The black matrix BM may overlap the pixel defining layer PDL.

The color filter layer CFL may further include an overcoating layer OCL. The overcoating layer OCL may include organic insulating material. The material of the overcoating layer OCL is not particularly limited, so long as the material allows the overcoating layer OCL to have an appropriate thickness and planarize an upper surface of the color filter layer CFL. For example, the overcoating layer OCL may include acrylate-based organic material.

The window WM is located over the color filter layer CFL, and may cover layers provided thereunder.

When the finger US_F of the user approaches the window WM, an operation of sensing fingerprint information may start. If the first and second light emitting elements LD1 and LD2 emit light and the light receiving element PD22 that is directly adjacent thereto sense the light, a sensing signal generated from the light receiving element PD22 would not appropriately reflect the fingerprint information corresponding to the finger US_F of the user because the light receiving element PD22 is relatively close to the first and second light emitting elements LD1 and LD2. For example, light generated from the first and second light emitting elements LD1 and LD2 may not reach the finger US_F of the user, and may be reflected by interfaces between the layers of the display device DD that are adjacent to the first and second light emitting elements LD1 and LD2 before reaching the light receiving element PD22. The foregoing indicates that light incident on the light receiving element PD22 does not reflect information about the finger US_F of the user.

As another example, electrical noise generated by the operation of the first and second light emitting elements LD1 and LD2 may affect the operation of the light receiving element PD22 adjacent thereto. The foregoing indicates that a sensing signal generated from the light receiving element PD22 has low reliability. In more detail, the light receiving element PD22 may share the hole control layer HCL with the first and second light emitting elements LD1 and LD2. Movement of holes caused by the operation of the first and second light emitting elements LD1 and LD2 may affect the adjacent light receiving element PD22 through the shared hole control layer HCL. Such noise may be reflected in a sensing signal generated from the light receiving element PD22. In this case, the sensing signal generated from the light receiving element PD22 may have relatively low reliability.

The applicant has discovered that, in the case where the light receiving element PD22 is relatively distant from the light emitting element that has generated light, a sensing signal generated from the light receiving element PD22 reflects the finger US_F of the user with relatively high reliability. The applicant has discovered that, in that case where a reflection angle of light RFL outputted from the light emitting element and reflected by the finger US_F of the user is relatively increased, the light outputted from the light emitting element can be reflected by the finger US_F of the user with low optical loss and can reach the light receiving element PD22. Here, the reflection angle ANG may be an angle of a traveling direction of light RFL reflected by the finger US_F of the user with a third direction DR3. Because the window WM is relatively thick compared to the other layers of the display device DD, the thickness of the window WM may have a relatively large effect on the reflection angle ANG. Therefore, an appropriate distance between the light emitting element that has generated light and the light receiving element PD22 may be determined by the thickness of the window WM. For example, as the thickness of the window WM is increased, the distance between the light emitting element that has generated light and the light receiving element PD22 may be increased. As the thickness of the window WM is reduced, the distance between the light emitting element that has generated light and the light receiving element PD22 may be reduced.

Furthermore, in the case where the light receiving element PD22 is relatively distant from the light emitting element that has generated light, an effect of electrical noise caused by the operation of the light emitting element that has generated light on the light receiving element PD22 may be relatively reduced.

An arrangement relationship between light emitting elements that generate light and the light receiving elements used to generate fingerprint data, will be described in more detail with reference to FIGS. 9 to 20.

Figure 8:
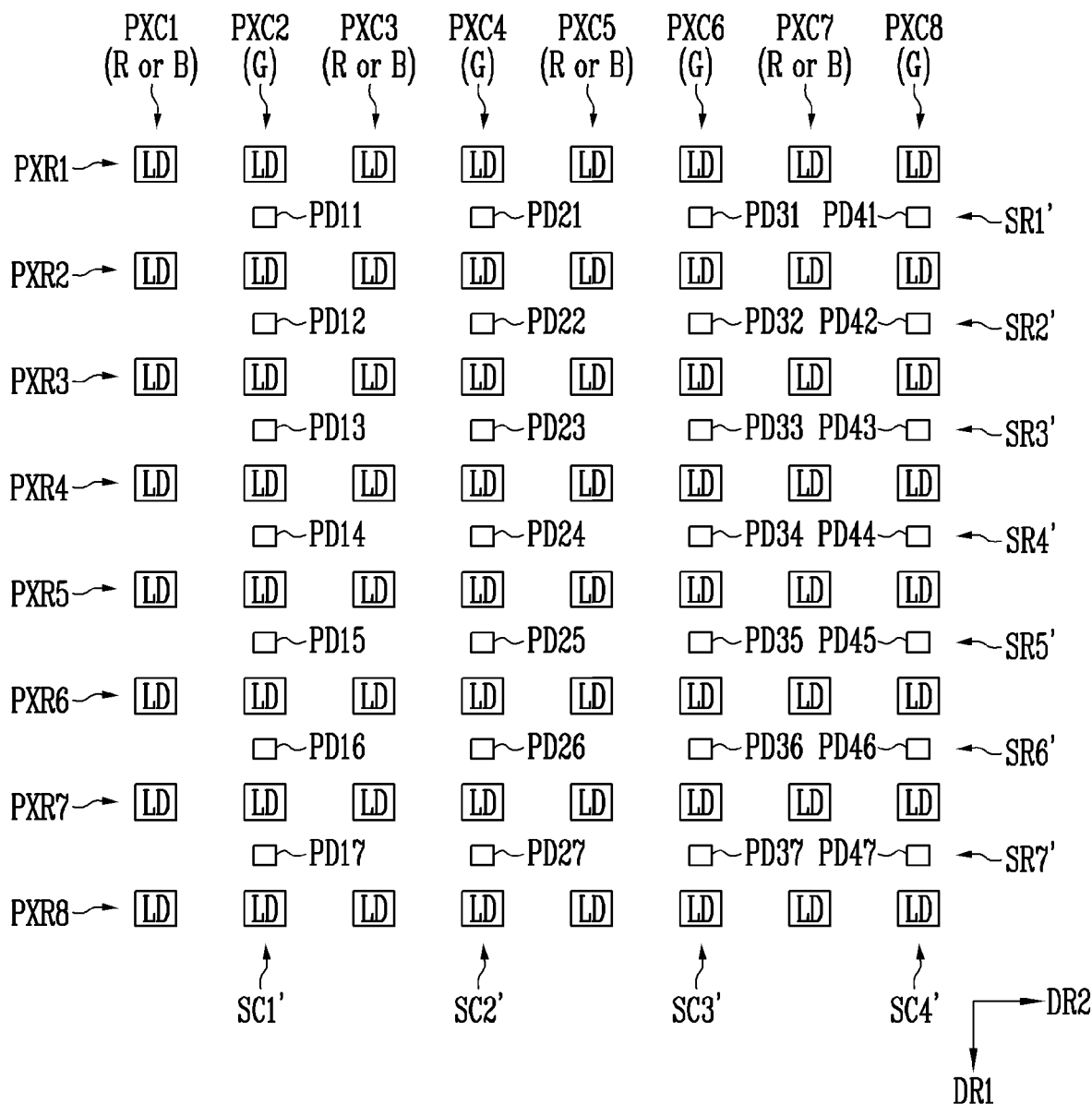
FIG. 8 is a plan view illustrating an arrangement of light emitting elements of pixels and light receiving elements of sensors in the display device of FIG. 3 according to some embodiments of the present disclosure.

FIG. 8 is a plan view illustrating aspects of an arrangement of the light emitting elements of the pixels and the light receiving elements of the sensors in the display device of FIG. 3 according to some embodiments of the present disclosure.

The arrangement of the light receiving elements may be changed in various ways. Referring to FIG. 8, the light receiving elements may be arranged on the first to seventh sensor rows SR1' to SR7' and the first to fourth sensor columns SC1' to SC4'.

Unlike the arrangement of the light receiving elements of FIG. 6, each of first to fourth sensor columns SC1'~SC4' may include light receiving elements located on first to seventh sensor rows SR1' to SR7'. Light receiving elements PD11 to PD17 may be arranged on the first to seventh sensor rows SR1' to SR7' in the first sensor column SC1'. Light receiving elements PD21 to PD27 may be arranged on the first to seventh sensor rows SR1' to SR7' in the second sensor column SC2'. Light receiving elements PD31 to PD37 may be arranged on the first to seventh sensor rows SR1' to SR7' in the third sensor column SC3'. Light receiving elements PD41 to PD47 may be arranged on the first to seventh sensor rows SR1' to SR7' in the fourth sensor column SC4'. As such, the light receiving elements may be arranged on the display panel DP of FIG. 3 in various ways depending on the embodiments.

Figure 9:
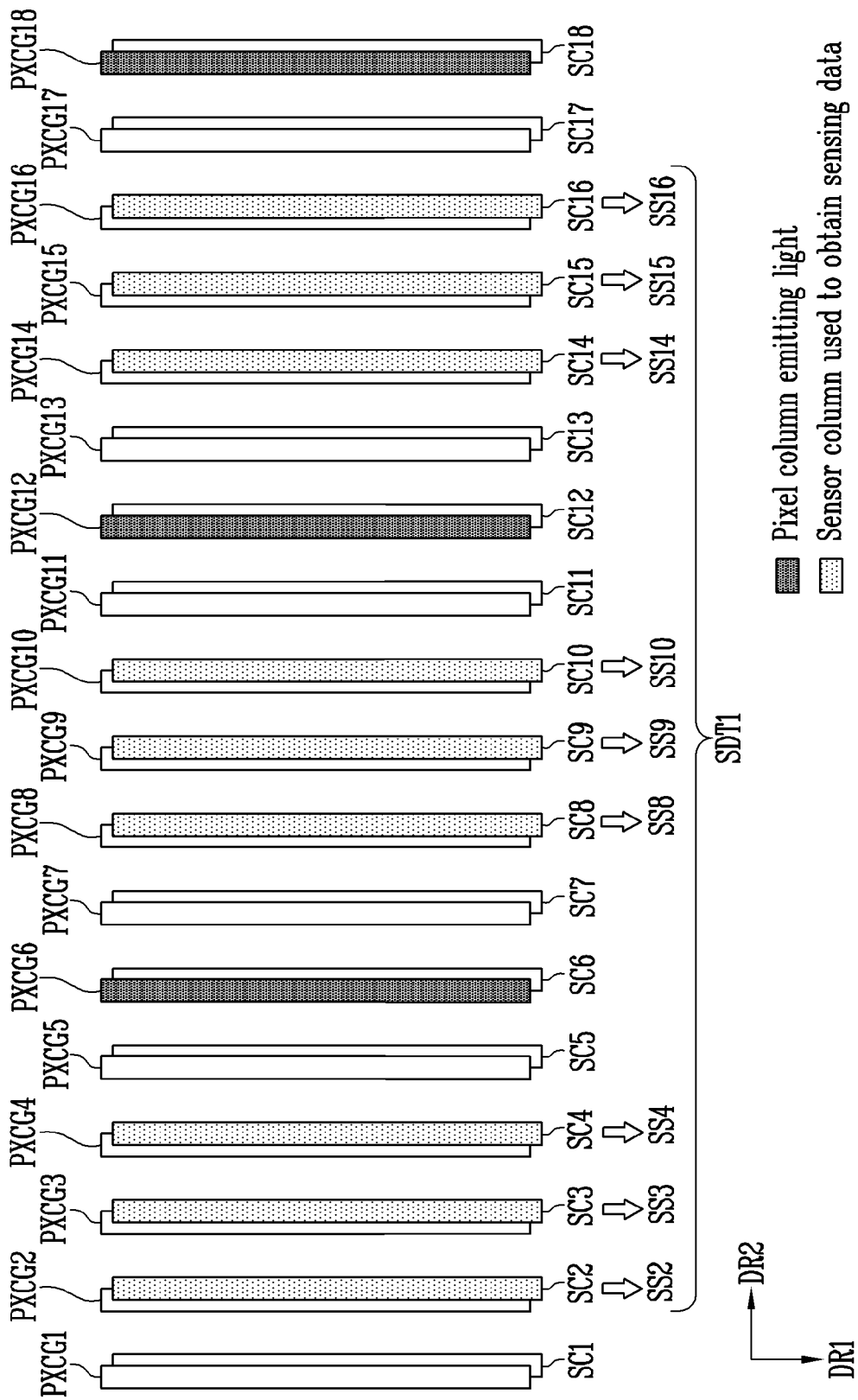
FIGS. 9 and 10 are diagrams showing an arrangement relationship between pixel columns that generate light, and sensor columns used to generate fingerprint data when the pixel columns emit light according to some embodiments of the present disclosure.
Figure 10:
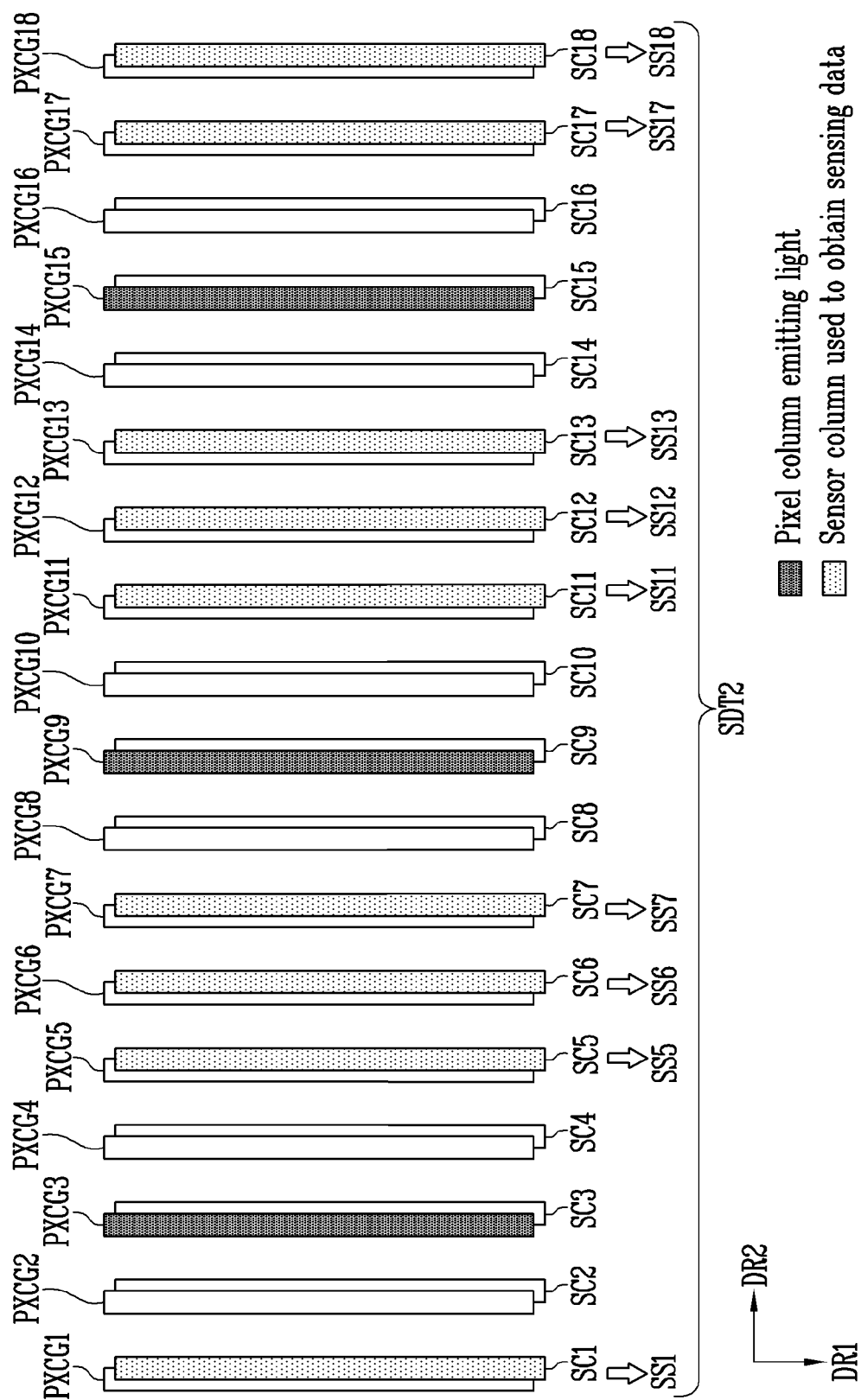

FIGS. 9 and 10 are diagrams showing aspects of an arrangement relationship between pixel columns that generate light, and sensor columns used to generate fingerprint data when the pixel columns emit light according to some embodiments of the present disclosure.

Referring to FIG. 9, as described with reference to FIG. 6, a plurality of green pixel columns PXCG1 to PXCG18 may be arranged in the second direction DR2, and each may extend in the first direction DR1. In FIGS. 9, 10, and 13 to 16, only green pixel columns among the pixel columns of the display panel DP are illustrated for clear and concise description. The green pixel column is a pixel column including light emitting elements configured to generate light of green (G). For example, the even-numbered pixel columns PXC2, PXC4, PXC6, and PXC8 of FIG. 6 may be included in the first to eighteenth green pixel columns PXCG1 to PXCG18.

First to eighteenth sensor columns SC1 to SC18 may be arranged in the second direction DR2, and each may extend in the first direction DR1. As described with reference to FIG. 6, the first to eighteenth sensor columns SC1 to SC18 may be respectively located adjacent and parallel to the first to eighteenth green pixel columns PXCG1 to PXCG18.

Operations for obtaining the fingerprint data of the finger of the user that is close to the display panel DP (refer to FIG. 3).

First, a first sensing data set SDT1 may be obtained. To this end, green pixel columns spaced apart from each other with at least one green pixel column interposed therebetween may output light.

The light emitting elements of a 6k-th green pixel column PXCG6$k$ (k is a positive integer) may emit light. As illustrated in FIG. 9, the sixth, twelfth, and eighteenth green pixel columns PXCG6, PXCG12, and PXCG18 may emit light. Here, the other green pixel columns PXCG1 to PXCG5, PXCG7 to PXCG11, and PXCG13 to PXCG17 among the first to eighteenth green pixel columns PXCG1 to PXCG18 may not emit light.

A sensor column that is located adjacent and parallel to each green pixel column that emits light may be unselected, and a sensor column that is spaced apart from each green pixel column that emits light may be selected. Sensor columns that are located adjacent and parallel to at least some of the green pixel columns PXCG1 to PXCG5, PXCG7 to PXCG11, and PXCG13 to PXCG17 that are inhibited from emitting light may be selected so that a first sensing data set SDT1 is obtained.

According to some embodiments, as illustrated in FIG. 9, light receiving elements of the second to fourth sensor columns SC2 to SC4, the eighth to tenth sensor columns SC8 to SC10, and the fourteenth to sixteenth sensor columns SC14 to SC16 may be selected. The sixth, twelfth, and eighteenth sensor columns SC6, SC12, and SC18 that are located adjacent and parallel to the sixth, twelfth, and eighteenth green pixel columns PXCG6, PXCG12, and PXCG18 are unselected. The fifth, seventh, eleventh, thirteenth, and seventeenth sensor columns SC5, SC7, SC11, SC13, and SC17 that are adjacent to the sixth, twelfth, and eighteenth green pixel columns PXCG6, PXCG12, and PXCG18 may be unselected. In addition, the first sensor column SC1 may be unselected.

According to some embodiments, the readout circuit 350 of FIG. 3 may receive sensing signals from the light receiving elements of the first to eighteenth sensor columns SC1 to SC18, and provide sensing data SD to the driving controller 310 of FIG. 3. Here, the driving controller 310 may obtain, as the first sensing data set SDT1, data corresponding to the selected sensor columns SC2 to SC4, SC8 to SC10, and SC14 to SC16 among the sensing data SD. The driving controller 310 may drop data corresponding to the unselected sensor columns SC1, SC5 to SC7, SC11 to SC13, SC17, and SC18 among the sensing data SD. Consequently, the first sensing data set SDT1 may be determined based on the second to fourth, eighth to tenth, and fourteenth to sixteenth sensing signals SS2 to SS4, SS8 to SS10, and SS14 to SS16 that are outputted from the selected sensor columns SC2 to SC4, SC8 to SC10, and SC14 to SC16.

As such, when the 6k-th green pixel column PXCG6$k$ emits light, the second to fourth, eighth to tenth, and fourteenth to sixteenth sensor columns SC2 to SC4, SC8 to SC10, and SC14 to SC16 may be selected so that the first sensing data set SDT1 can be obtained. The seventh pixel column PXCG7 or the seventh sensor column SC7 are located between the eighth to tenth sensor columns SC8 to SC10 and the sixth pixel column PXCG6. The eleventh pixel column PXCG11 or the eleventh sensor column SC11 are located between the eighth to tenth sensor columns SC8 to SC10 and the twelfth pixel column PXCG12. Likewise, the second to fourth sensor columns SC2 to SC4 may be relatively distant from the sixth pixel column PXCG6. The fourteenth to sixteenth sensor columns SC14 to SC16 may be relatively distant from the twelfth and eighteenth pixel columns PXCG12 and PXCG18. As such, because the selected sensor columns SC2 to SC4, SC8 to SC10, and SC14 to SC16 are relatively distant from the 6k-th green pixel column PXCG6k, the first sensing data set SDT1 may reflect the fingerprint information of the finger US_F (refer to FIG. 6) of the user with relatively high reliability.

Subsequently, a second sensing data set SDT2 may be obtained.

Referring to FIG. 10, the light emitting elements of some of the green pixel columns PXCG1 to PXCG5, PXCG7 to PXCG11, and PXCG13 to PXCG17 that have been inhibited from emitting light to obtain the first sensing data set SDT1 may emit light.

According to some embodiments, the light emitting elements of a 6k-3-th green pixel column PXCG (6k-3) may emit light. As illustrated in FIG. 10, the third, ninth, and fifteenth green pixel columns PXCG3, PXCG9, and PXCG15 may emit light. The other green pixel columns PXCG1, PXCG2, PXCG4 to PXCG8, PXCG10 to PXCG14, and PXCG16 to PXCG18 among the first to eighteenth green pixel columns PXCG1 to PXCG18 may not emit light.

Sensor columns that are located adjacent and parallel to at least some of the green pixel columns PXCG1, PXCG2, PXCG4 to PXCG8, PXCG10 to PXCG14, and PXCG16 to PXCG18 that have been inhibited from emitting light may be selected so that a second sensing data set SDT2 is obtained.

Sensor columns spaced apart from each green pixel column that emits light may be selected. According to some embodiments, as illustrated in FIG. 10, the light receiving elements of the first sensor column SC1, the fifth to seventh sensor columns SC5 to SC7, the eleventh to thirteenth sensor columns SC11 to SC13, and the seventh and eighth sensor columns SC17 and SC18 may be selected. The sensor columns that have been selected when the first sensing data set SDT1 is obtained may be unselected, and the sensor columns that have been unselected when the first sensing data sent SDT1 is obtained may be selected. As such, a first group of sensor columns SC2 to SC4, SC8 to SC10, and SC14 to SC16 may be selected to obtain the first sensing data set SDT1. A second group of sensor columns SC1, SC5 to SC7, SC11 to SC13, SC17, and SC18 may be selected to obtain the second sensing data set SDT2.

According to some embodiments, the readout circuit 350 of FIG. 3 may receive sensing signals from the light receiving elements of the first to eighteenth sensor columns SC1 to SC18, and provide sensing data SD of FIG. 3 to the driving controller 310. Here, the driving controller 310 may obtain, as the second sensing data set SDT2, data corresponding to the selected sensor columns SC1, SC5 to SC7, SC11 to SC13, SC17, and SC18 among the sensing data SD. The driving controller 310 may drop data corresponding to the unselected sensor columns SC2 to SC4, SC8 to SC10, and SC14 to SC16 among the sensing data SD. Consequently, the second sensing data set SDT2 may be determined based on the first, fifth to seventh, eleventh to thirteen, seventeenth, and eighteenth sensing signals SS1, SS5 to SS7, SS11 to SS13, SS17, and SS18 outputted from the selected sensor columns SC1, SC5 to SC7, SC11 to SC13, SC17, and SC18.

As such, when the 6k-3-th green pixel column PXCG (6k-3) emits light, the sensor columns SC1, SC5 to SC7, SC11 to SC13, SC17, and SC18 that are spaced apart from the 6k-3-th green pixel column PXCG (6k-3) may be selected so that the second sensing data set SDT2 can be obtained. Because the selected sensor columns SC1, SC5 to SC7, SC11 to SC13, SC17, and SC18 are relatively distant from the 6k-3-th green pixel column PXCG (6k-3), the second sensing data set SDT2 may reflect the fingerprint information of the finger US_F (refer to FIG. 6) of the user with relatively high reliability.

Thereafter, sensing data corresponding to the first to eighteenth sensor columns SC1 to SC18 may be obtained based on the first and second sensing data sets SDT1 and SDT2. The driving controller 310 may generate fingerprint data of the user based on the first and second sensing data sets SDT1 and SDT2.

Figure 11:
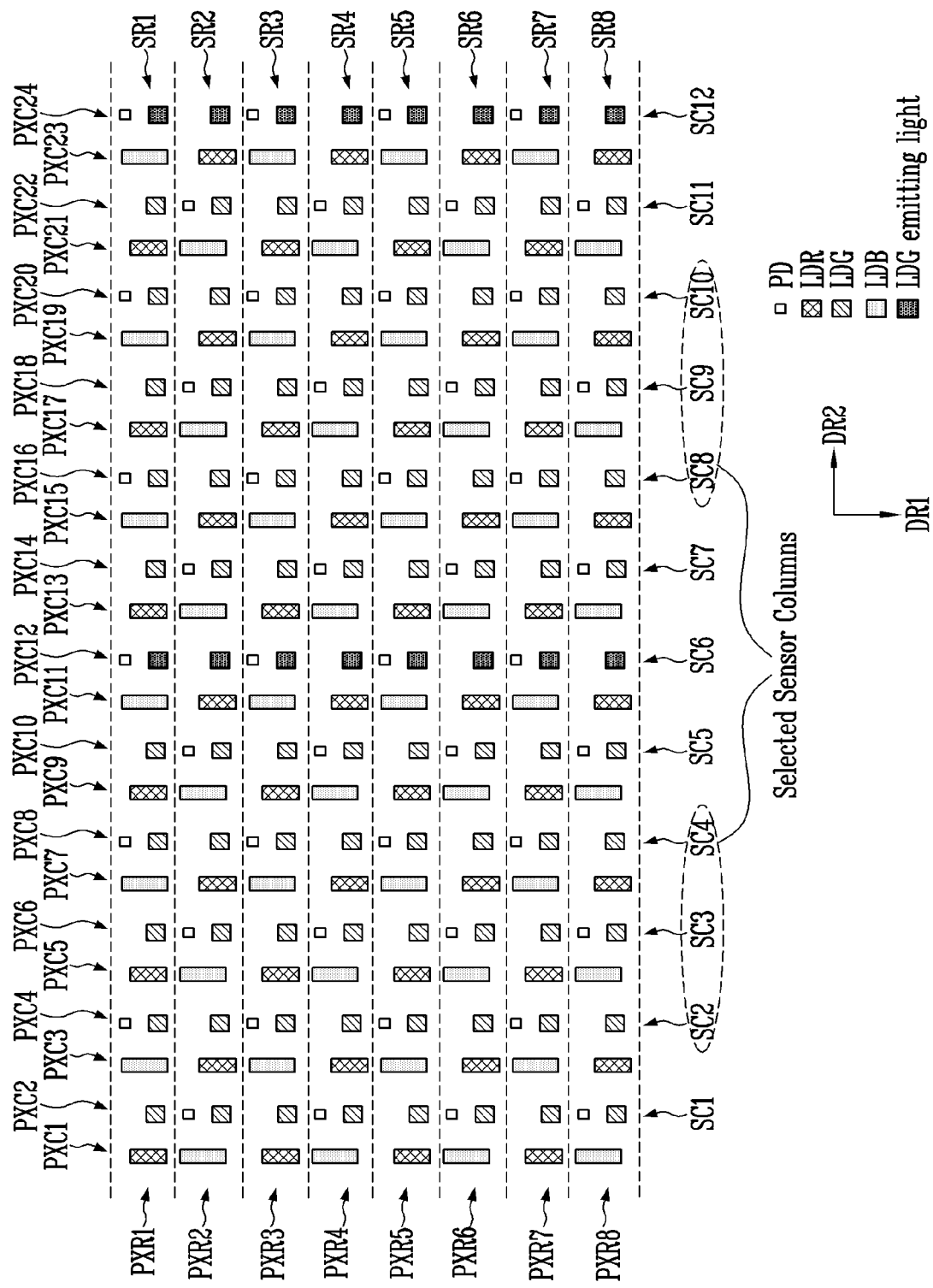
FIGS. 11 and 12 are plan views for describing the light emitting elements that generate light, and the sensors used to generate fingerprint data when the light emitting elements emit light, in accordance with the arrangement relationships of FIGS. 9 and 10 according to some embodiments of the present disclosure.
Figure 12:
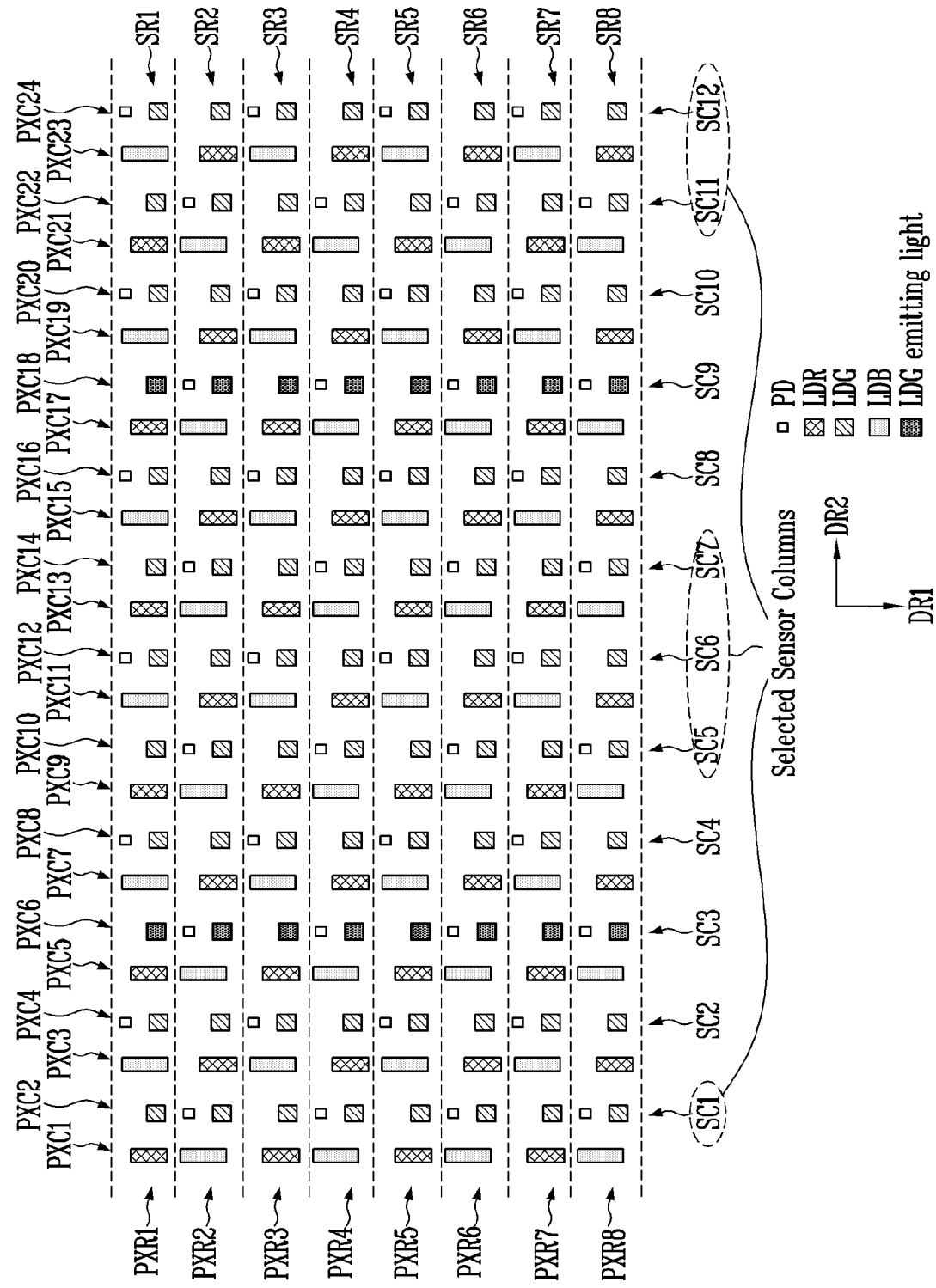

FIGS. 11 and 12 are plan views for describing light emitting elements that generate light, and the sensors used to generate fingerprint data when the light emitting elements emit light, in accordance with the arrangement relationships of FIGS. 9 and 10.

Referring to FIG. 11, red light emitting elements LDR, green light emitting elements LDG, and blue light emitting elements LDB may be arranged along a plurality of pixel rows PXR1 to PXR8 and a plurality of pixel columns PXC1 to PXC24. Here, the red light emitting elements LDR may be light emitting elements configured to emit red light. The green light emitting elements LDG may be light emitting elements configured to emit green light. The blue light emitting elements LDB may be light emitting elements configured to emit blue light.

Successive arrangement of the blue light emitting elements, the green light emitting elements, and the red light emitting elements may be repeated on each of the even-numbered pixel rows PXR2, PXR4, PXR6, and PXR8. Successive arrangement of the red light emitting elements, the green light emitting elements, and the blue light emitting elements may be repeated on each of the odd-numbered pixel rows PXR1, PXR3, PXR5, and PXR7. However, embodiments are not limited to the foregoing. Successive arrangement of the blue light emitting elements, the green light emitting elements, and the red light emitting elements may be repeated on each of the odd-numbered pixel rows PXR1, PXR3, PXR5, and PXR7. Successive arrangement of the blue light emitting elements, the green light emitting elements, and the red light emitting elements may be repeated on each of the even-numbered pixel rows PXR2, PXR4, PXR6, and PXR8.

According to some embodiments, red light emitting elements LDR and blue light emitting elements LDB may be alternately arranged on each of the odd-numbered pixel columns PXC1, PXC3, PXC5, PXC7, PXC9, PXC11, PXC13, PXC15, PXC17, PXC19, PXC21, and PXC23. Green light emitting elements LDG may be arranged on each of the even-numbered pixel columns PXC2, PXC4, PXC6, PXC8, PXC10, PXC12, PXC14, PXC16, PXC18, PXC20, PXC22, and PXC24. The even-numbered pixel columns PXC2, PXC4, PXC6, PXC8, PXC10, PXC12, PXC14, PXC16, PXC18, PXC20, PXC22, and PXC24 may be understood as being included in the first to eighteenth green pixel columns PXCG1 to PXCG18 of FIG. 9.

The light receiving elements PD may be arranged along the first to eighth sensor rows SR1 to SR8 and the first to twelfth sensor columns SC1 to SC12. The first to eighth sensor rows SR1 to SR8 may be respectively located adjacent and parallel to the first to eighth pixel rows PXR1 to PXR8. The first to twelfth sensor columns SC1 to SC12 may be respectively located adjacent and parallel to the even-numbered pixel columns PXC2, PXC4, PXC6, PXC8, PXC10, PXC12, PXC14, PXC16, PXC18, PXC20, PXC22, and PXC24.

According to some embodiments, the light receiving elements PD may be located on the even-numbered sensor rows SR2, SR4, SR6, and SR8 on the odd-numbered sensor columns. The light receiving elements PD may be located on the odd-numbered sensor rows SR1, SR3, SR5, and SR7 on the even-numbered sensor columns.

The green light emitting elements LDG of the twelfth pixel column PXC12 and the twenty-fourth pixel column PXC24 may emit light. For example, each of the twelfth and twenty-fourth pixel columns PXC12 and PXC24 may function as a 6k-th green pixel column PXCG6k of FIG. 9. The other pixel columns PXC1 to PXC11, and PXC13 to PXC23 are inhibited from emitting light.

Sensor columns spaced apart from each of the twelfth and twenty-fourth pixel columns PXC12 and PXC24 may be selected. As illustrated in FIG. 11, the second to fourth sensor columns SC2 to SC4 and the eighth to tenth sensor columns SC8 to SC10 may be selected.

A first sensing data set may be obtained from the selected second to fourth and eighth to tenth sensor columns SC2 to SC4 and SC8 to SC10.

Subsequently, referring to FIG. 12, the green light emitting elements LDG of the sixth pixel column PXC6 and the eighteenth pixel column PXC18 may emit light. For example, each of the sixth and eighteenth pixel columns PXC6 and PXC18 may function as a 6k-3-th green pixel column PXCG (6k-3) of FIG. 10. The other pixel columns PXC1 to PXC5, PXC7 to PXC17, and PXC19 to PXC24 are inhibited from emitting light.

Sensor columns spaced apart from each of the sixth and eighteenth pixel columns PXC6 and PXC18 may be selected. As illustrated in FIG. 12, the first, fifth to seventh, eleventh, and twelfth sensor columns SC1, SC5~SC7, SC11, and SC12 may be selected so that a second sensing data set can be obtained.

Subsequently, fingerprint data may be generated based on the first and second sensing data sets.

Figure 13:
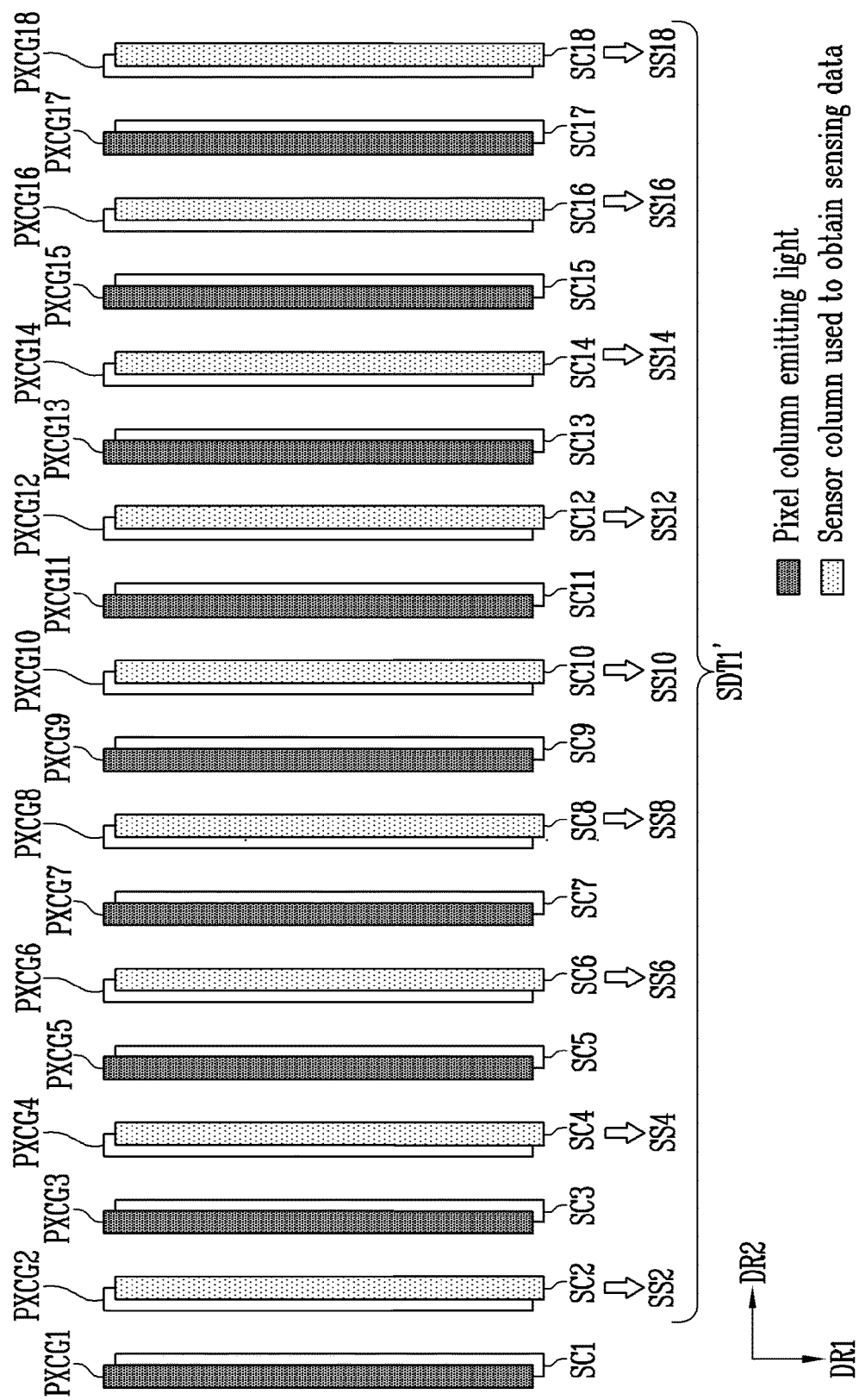
FIGS. 13 and 14 are diagrams showing an arrangement relationship between pixel columns that generate light, and sensor columns used to generate fingerprint data when the pixel columns emit light according to some embodiments of the present disclosure.
Figure 14:
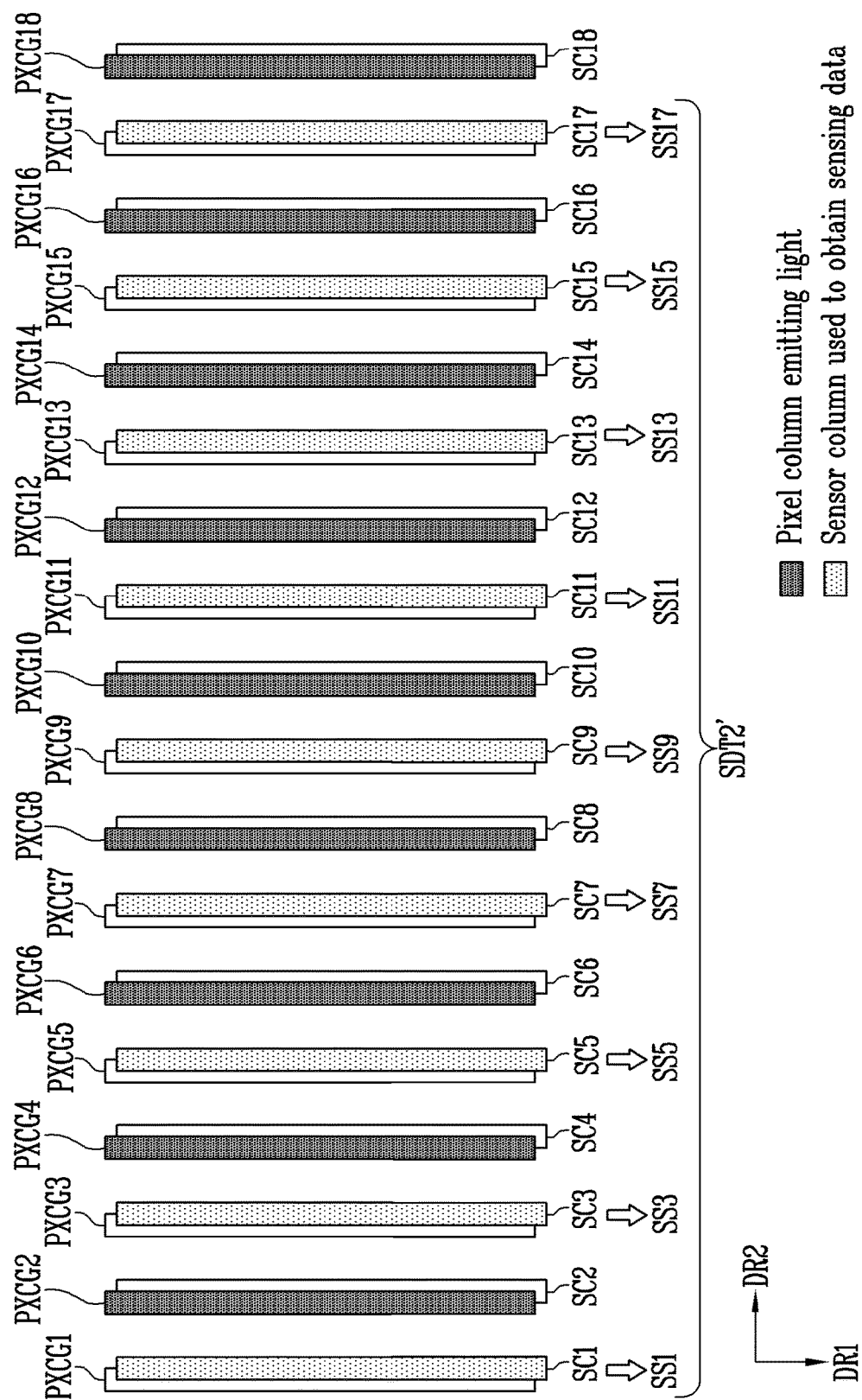

FIGS. 13 and 14 are diagrams showing aspects of an arrangement relationship between pixel columns that generate light, and sensor columns used to generate fingerprint data when the pixel columns emit light according to some embodiments of the present disclosure.

A first sensing data set SDT1' may be obtained. Referring to FIG. 13, the light emitting elements of a 2I-1-th green pixel column PXCG (2I-1) may emit light (I is a positive integer). As illustrated in FIG. 13, the odd-numbered green pixel columns PXCG1, PXCG3, PXCG5, PXCG7, PXCG9, PXCG11, PXCG13, PXCG15, and PXCG17 may emit light.

The even-numbered sensor columns SC2, SC4, SC6, SC8, SC10, SC12, SC14, SC16, and SC18 that are located adjacent and parallel to the even-numbered green pixel columns PXCG2, PXCG4, PXCG6, PXCG8, PXCG10, PXCG12, PXCG14, PXCG16, and PXCG18 that are inhibited from emitting light may be selected, so that the first sensing data set SDT1' can be obtained based on sensing signals SS2, SS4, SS6, SS8, SS10, SS12, SS14, SS16, and SS18.

As such, when the 2I-1-th green pixel column PXCG (2I-1) emits light, the even-numbered sensor columns SC2, SC4, SC6, SC8, SC10, SC12, SC14, SC16, and SC18 that are spaced apart from the 2I-1-th green pixel column PXCG (2I-1) are selected so that the first sensing data set SDT1' can be obtained. Because the even-numbered sensor columns SC2, SC4, SC6, SC8, SC10, SC12, SC14, SC16, and SC18 are relatively distant from the 2I-1-th green pixel column PXCG (2I-1), the first sensing data set SDT1' may reflect the fingerprint information of the finger US_F (refer to FIG. 6) of the user with relatively high reliability.

Subsequently, a second sensing data set SDT2' may be obtained. Referring to FIG. 14, the light emitting elements of a 2I-th green pixel column PXCG2I. The even-numbered green pixel columns PXCG2, PXCG4, PXCG6, PXCG8, PXCG10, PXCG12, PXCG14, PXCG16, and PXCG18 may emit light.

The odd-numbered sensor columns SC1, SC3, SC5, SC7, SC9, SC11, SC13, SC15, and SC17 that are located adjacent and parallel to the odd-numbered green pixel columns PXCG1, PXCG3, PXCG5, PXCG7, PXCG9, PXCG11, PXCG13, PXCG15, and PXCG17 that are inhibited from emitting light may be selected, so that the second sensing data set SDT2' can be obtained based on sensing signals SS1, SS3, SS5, SS7, SS9, SS11, SS13, SS15, and SS17. Because the odd-numbered sensor columns SC1, SC3, SC5, SC7, SC9, SC11, SC13, SC15, and SC17 are relatively distant from the 2I-th green pixel column PXCG2l, the second sensing data set SDT2' may reflect the fingerprint information of the finger US_F (refer to FIG. 6) of the user with relatively high reliability.

Subsequently, fingerprint data of the user may be determined based on the first and second sensing data sets SDT1' and SDT2'.

Figure 15:
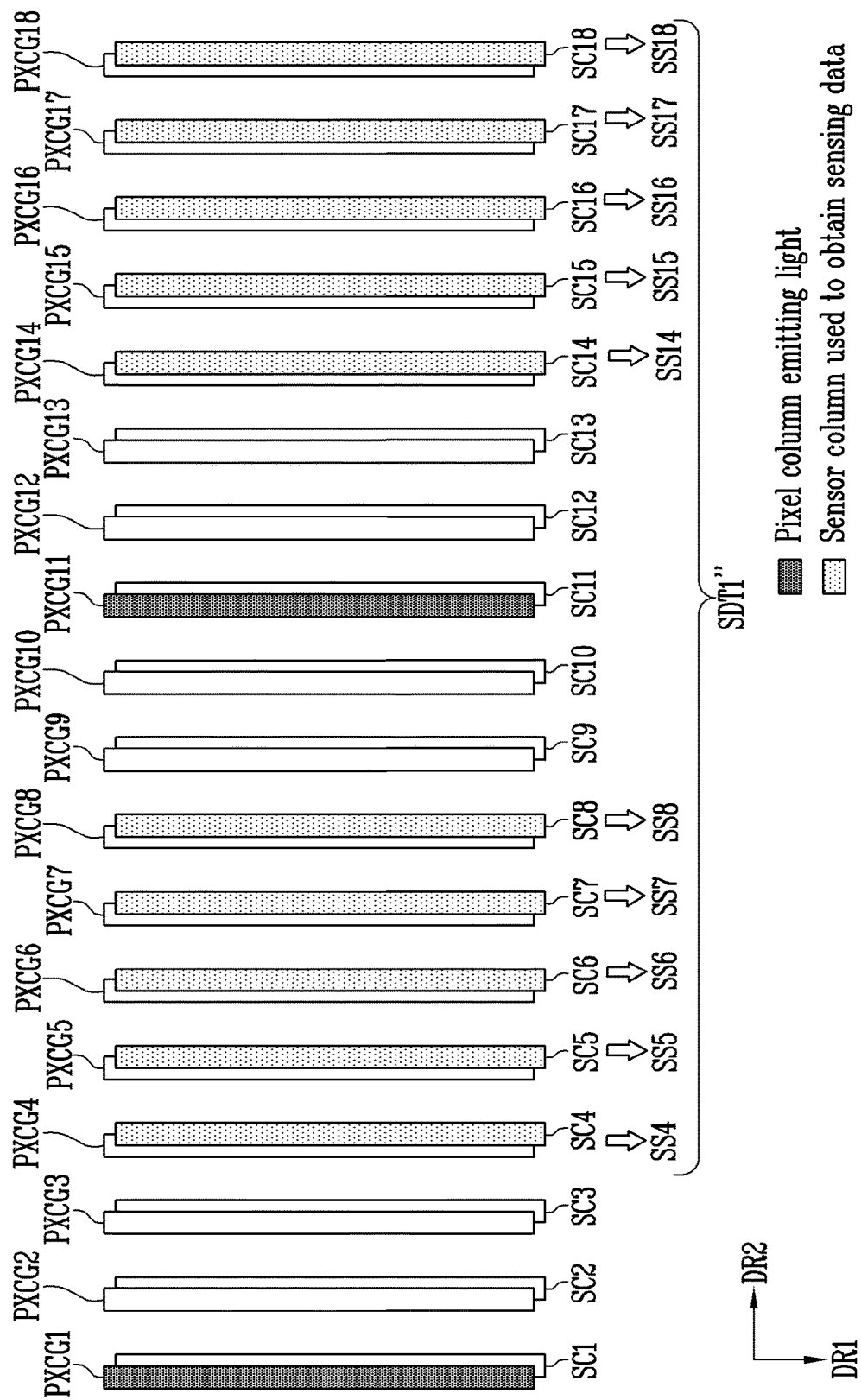
FIGS. 15 and 16 are diagrams showing an arrangement relationship between pixel columns that generate light, and sensor columns used to generate fingerprint data when the pixel columns emit light according to some embodiments of the present disclosure.
Figure 16:
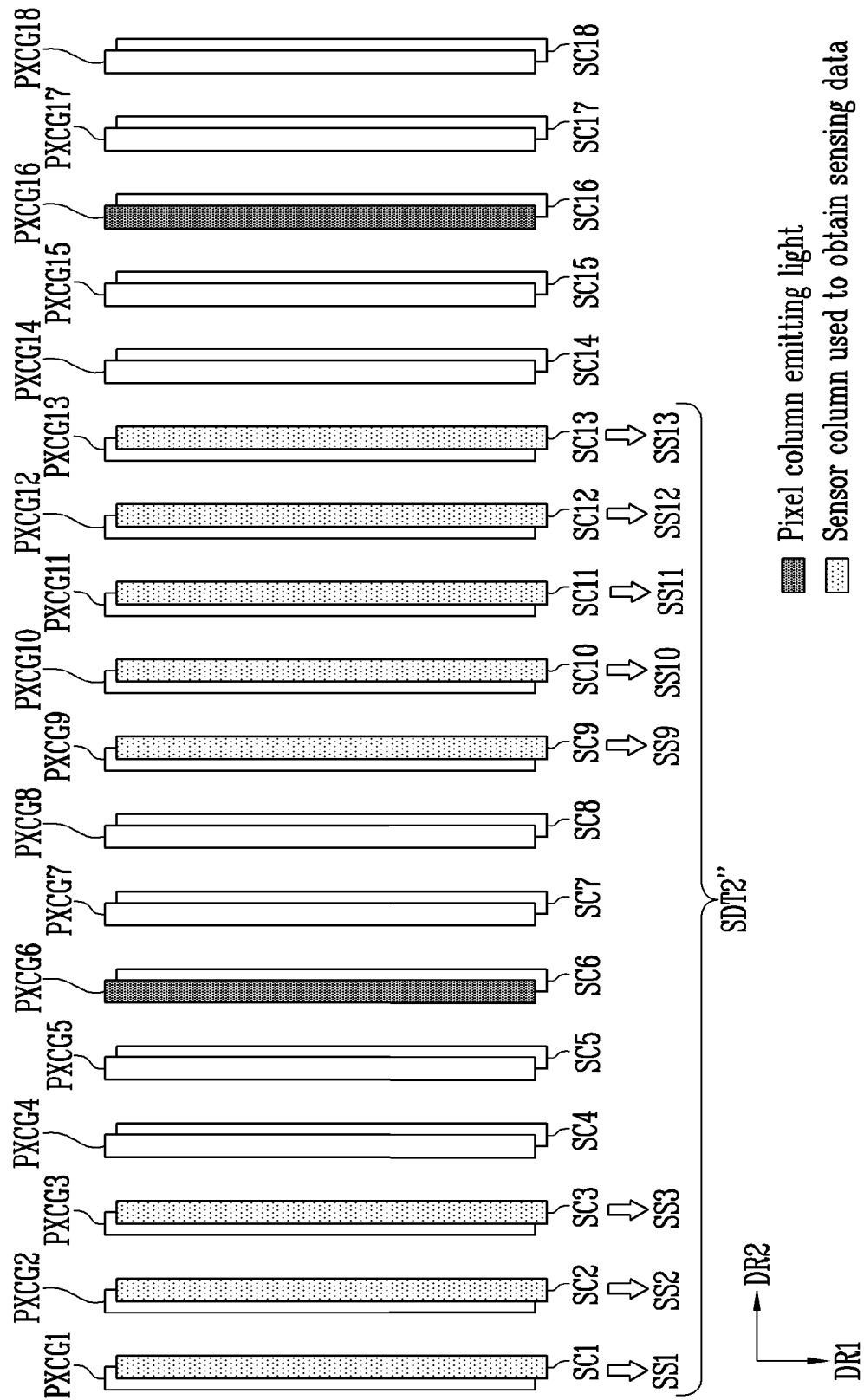

FIGS. 15 and 16 are diagrams showing aspects of an arrangement relationship between pixel columns that generate light, and sensor columns used to generate fingerprint data when the pixel columns emit light according to some embodiments.

A first sensing data set SDT1" may be obtained. Referring to FIG. 15, the light emitting elements of a 10r+1-th green pixel column PXCG (10r+1) may emit light (r is an integer equal to or greater than 0). As illustrated in FIG. 15, the first and eleventh green pixel columns PXCG1 and PXCG11 may emit light.

At least some of the sensor columns SC2 to SC10 and SC12 to SC18 located adjacent and parallel to the green pixel columns PXCG2 to PXCG10 and PXCG12 to PXCG18 that are inhibited from emitting light may be selected so that the first sensing data set SDT1" can be obtained. For example, the fourth to eighth and fourteenth to eighteenth sensor columns SC4 to SC8 and SC14 to SC18 may be selected, and the first sensing data set SDT1" may be obtained based on fourth to eighth and fourteenth to eighteenth sensing signals SS4 to SS8 and SS14 to SS18.

As such, when the 10r+1-th green pixel column PXCG (10r+1) emits light, the fourth to eighth and fourteenth to eighteenth sensor columns SC4 to SC8 and SC14 to SC18 that are spaced apart from the 10r+1-th green pixel column PXCG (10r+1) may be selected so that the first sensing data set SDT1" can be obtained. Hence, the first sensing data set SDT1" may reflect the fingerprint information of the finger US_F (refer to FIG. 6) of the user with relatively high reliability.

Subsequently, a second sensing data set SDT2" may be obtained. Referring to FIG. 16, the light emitting elements of a 10r+6-th green pixel column PXCG (10r+6) may emit light. For example, the sixth and sixteenth green pixel columns PXCG6 and PXCG16 may emit light.

At least some of the sensor columns SC1 to SC5, SC7 to SC15, SC17, and SC18 located adjacent and parallel to the green pixel columns PXCG1 to PXCG5, PXCG7 to PXCG15, PXCG17, and PXCG18 that are inhibited from emitting light may be selected so that the second sensing data set SDT2″ can be obtained. For example, the first to third and ninth to thirteenth sensor columns SC1 to SC3 and SC9 to SC13 may be selected, and the second sensing data set SDT2″ may be obtained based on first to third and ninth to thirteenth sensing signals SS1 to SS3 and SS9 to SS13.

As such, when the 10r+6-th green pixel column PXCG (10r+6) emits light, the first to third and ninth to thirteenth sensor columns SC1 to SC3 and SC9 to SC13 that are spaced apart from the 10r+6-th green pixel column PXCG (10r+6) may be selected so that the second sensing data set SDT2″ can be obtained. Hence, the second sensing data set SDT2″ may reflect the fingerprint information of the finger US_F (refer to FIG. 6) of the user with relatively high reliability.

Subsequently, fingerprint data of the user may be determined based on the first and second sensing data sets SDT1″ and SDT2″.

Figure 17:
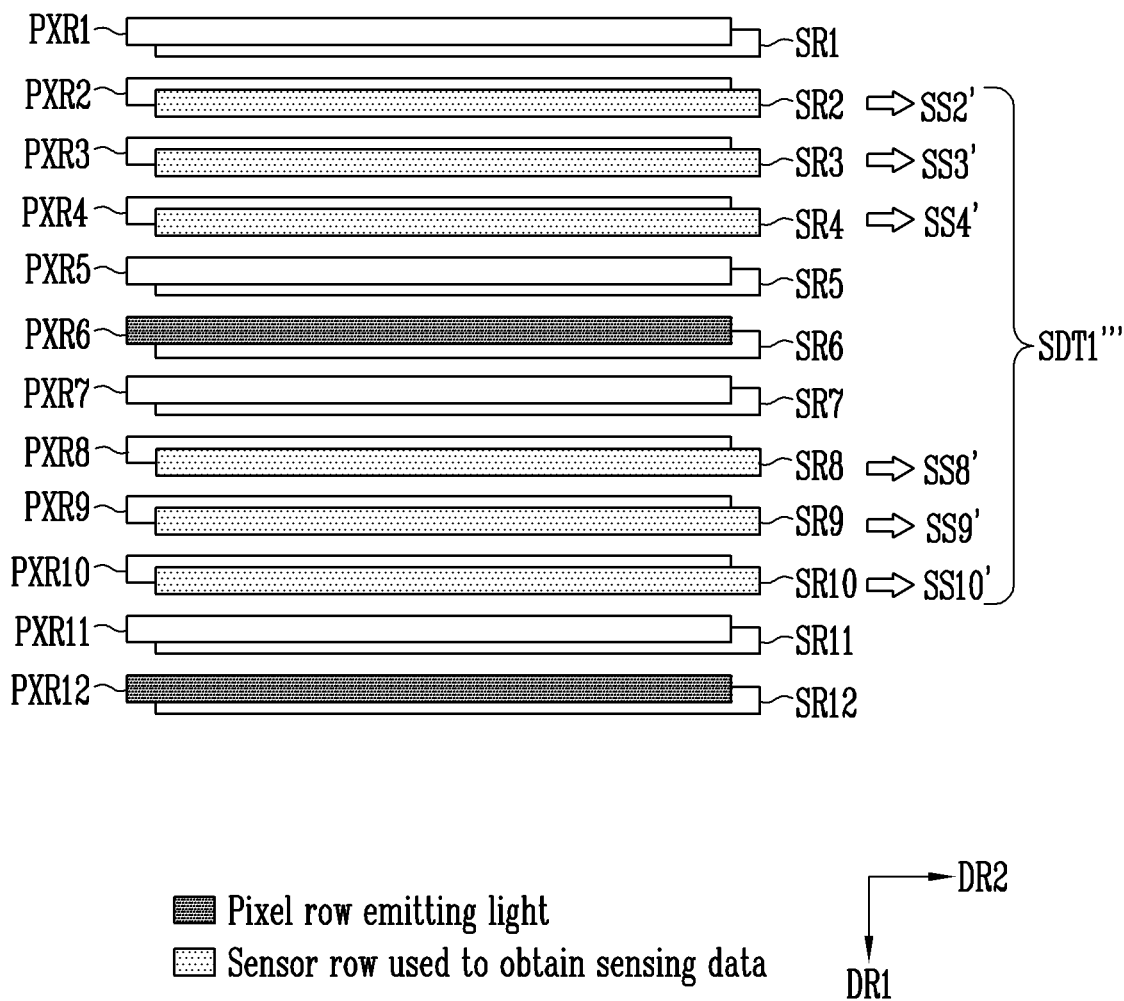
FIGS. 17 and 18 are diagrams showing an arrangement relationship between pixel rows configured to generate light and sensor rows which are used to generate fingerprint data when the pixel rows emit light according to some embodiments of the present disclosure.
Figure 18:
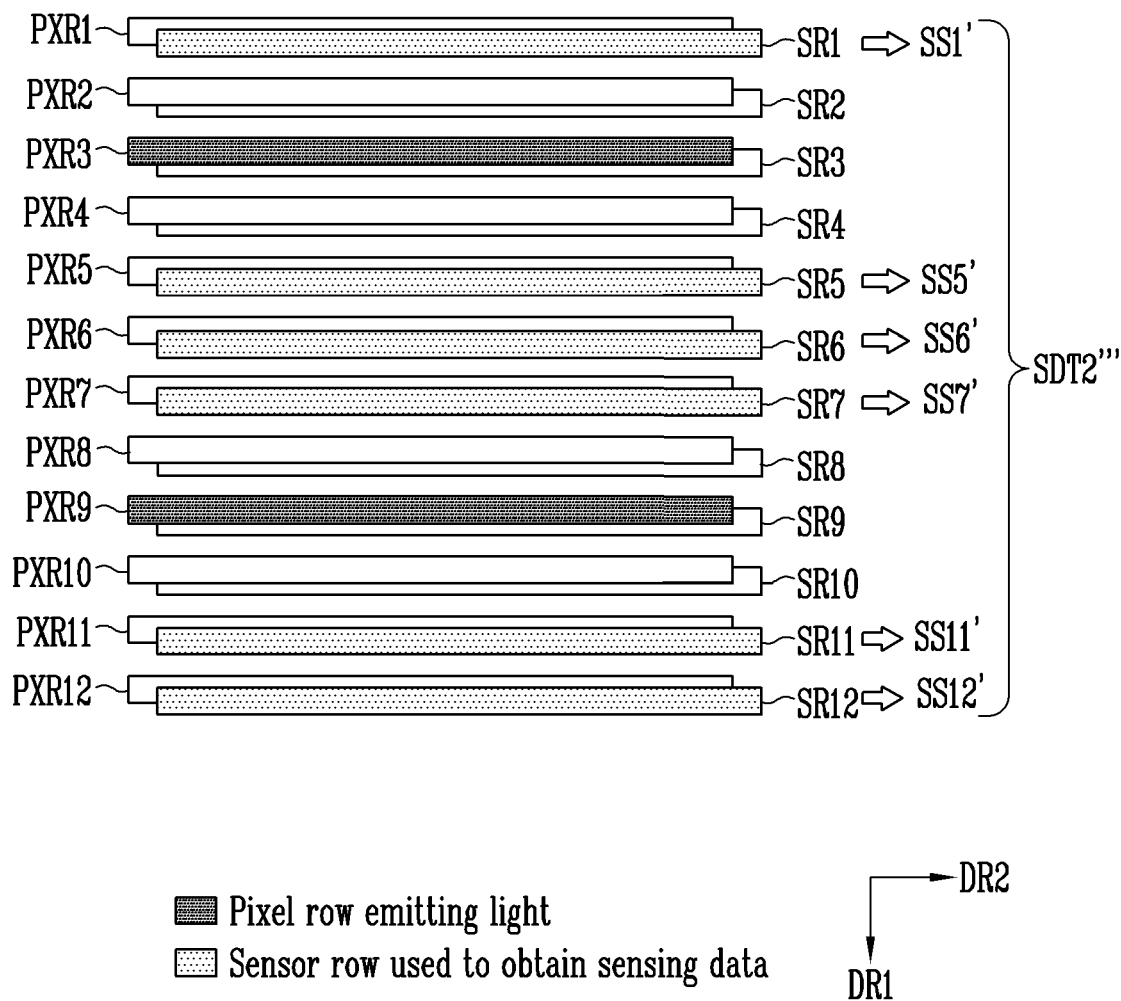

FIGS. 17 and 18 are diagrams showing aspects of an arrangement relationship between pixel rows configured to generate light and sensor rows which are used to generate fingerprint data when the pixel rows emit light according to some embodiments.

Referring to FIG. 17, as described with reference to FIG. 6, a plurality of pixel rows PXR1 to PXR12 may be arranged in the first direction DR1, and each may extend in the second direction DR2. The first to twelfth pixel rows PXR1 to PXR12 may be understood as including the first to eighth pixel rows PXR1 to PXR8 of FIG. 6.

First to twelfth sensor rows SR1 to SR12 may be arranged in the first direction DR1, and each may extend in the second direction DR2. The first to twelfth sensor rows SR1 to SR12 may be understood as including the first to seventh sensor rows SR1 to SR7 of FIG. 6. The first to twelfth sensor rows SR1 to SR12 may be respectively located adjacent and parallel to the first to twelfth pixel rows PXR1 to PXR12.

Operations for obtaining the fingerprint data of the finger of the user that is close to the display panel DP (refer to FIG. 3).

First, the green light emitting elements of pixel rows spaced apart from each other among the first to twelfth pixel rows PXR1 to PXR12 may emit light, and a first sensing data set SDT1‴ may be obtained from the selected sensor rows. The other types of light emitting elements, e.g., the red light emitting elements and the blue light emitting elements, may not emit light.

According to some embodiments, the green light emitting elements of a 6w-th pixel row PXR6w may emit light (w is a positive integer). As illustrated in FIG. 17, the green light emitting elements of the sixth and twelfth pixel rows PXR6 and PXR12 may emit light.

Sensor rows spaced apart from the sixth and twelfth pixel rows PXR6 and PXR12 are selected so that the first sensing data set SDT1‴ can be obtained. Sensor rows that are located adjacent and parallel to at least some of the pixel rows PXR1 to PXR5 and PXR7 to PXR11 that are inhibited from emitting light may be selected. For example, the second to fourth sensor rows SR2 to SR4 and the eighth to tenth sensor rows SR8 to SR10 may be selected.

According to some embodiments, the readout circuit 350 of FIG. 3 may receive sensing signals from the light receiving elements of the first to twelfth sensor rows SR1 to SR12, and provide sensing data SD of FIG. 3 to the driving controller 310. Here, the driving controller 310 may obtain, as the first sensing data set SDT1‴, data corresponding to the selected sensor rows SR2 to SR4 and SR8 to SR10 among the sensing data SD. The driving controller 310 may drop data corresponding to the unselected sensor rows SR1, SR5 to SR7, SR11, and SR12 among the sensing data SD. Consequently, the first sensing data set SDT1‴ may be determined based on second to fourth sensing signals SS2′ to SS4′ and eighth to tenth sensing signals SS8 to SS10′ that are outputted from the selected sensor rows SR2 to SR4 and SR8 to SR10.

As such, when the 6w-th pixel row PXR6w emits light, the second to fourth sensor rows SR2 to SR4 and the eighth to tenth sensor rows SR8 to SR10 that are spaced apart from the 6w-th pixel row PXR6w are selected so that the first sensing data set SDT1‴ can be obtained. Because the selected sensor rows SR2 to SR4 and SR8 to SR10 are relatively distant from the 6w-th pixel row PXR6w, the first sensing data set SDT1‴ may reflect the fingerprint information of the finger US_F (refer to FIG. 6) of the user with relatively high reliability.

Subsequently, the sensor rows SR1, SR5 to SR7, and SR11 to SR12 that have been unselected when the first sensing data set SDT1‴ is obtained, may be selected so that a second sensing data set DST2‴ can be obtained. Referring to FIG. 18, the green light emitting elements of a 6w-3-th pixel row PXR (6w-3) may emit light. As illustrated in FIG. 18, the green light emitting elements of the third and ninth pixel rows PXR3 and PXR9 may emit light.

Sensor rows spaced apart from the third and ninth pixel rows PXR3 and PXR9 are selected so that the second sensing data set SDT2‴ can be obtained. Sensor rows that are located adjacent and parallel to at least some of the pixel rows PXR1, PXR2, PXR4 to PXR8, and PXR10 to PXR12 that are inhibited from emitting light may be selected. For example, the first sensor row SR1, the fifth to seventh sensor rows SR5 to SR7, and the eleventh and twelfth sensor rows SR11 to SR12 may be selected. The second sensing data set SDT2‴ may be determined based on a first sensing signal SS1′, fifth to seventh sensing signals SS5′ to SS7′, an eleventh sensing signal SS11′, and a twelfth sensing signal SS12′ that are outputted from the selected sensor rows SR1, SR5 to SR7, and SR11 to SR12.

As such, when the 6w-3-th pixel row PXR (6w-3) emits light, the first sensor row SR1, the fifth to seventh sensor rows SR5 to SR7, and the eleventh and twelfth sensor rows SR11 to SR12 are selected so that the second sensing data set SDT2‴ can be obtained. Because the selected sensor rows SR1, SR5 to SR7, and SR11 to SR12 are relatively distant from the 6w-3-th pixel row PXR (6w-3), the second sensing data set SDT2‴ may reflect the fingerprint information of the finger US_F (refer to FIG. 6) of the user with relatively high reliability.

Subsequently, fingerprint data of the user may be generated based on the first sensing data set SDT1‴ and the second sensing data set SDT2‴.

Figure 19:
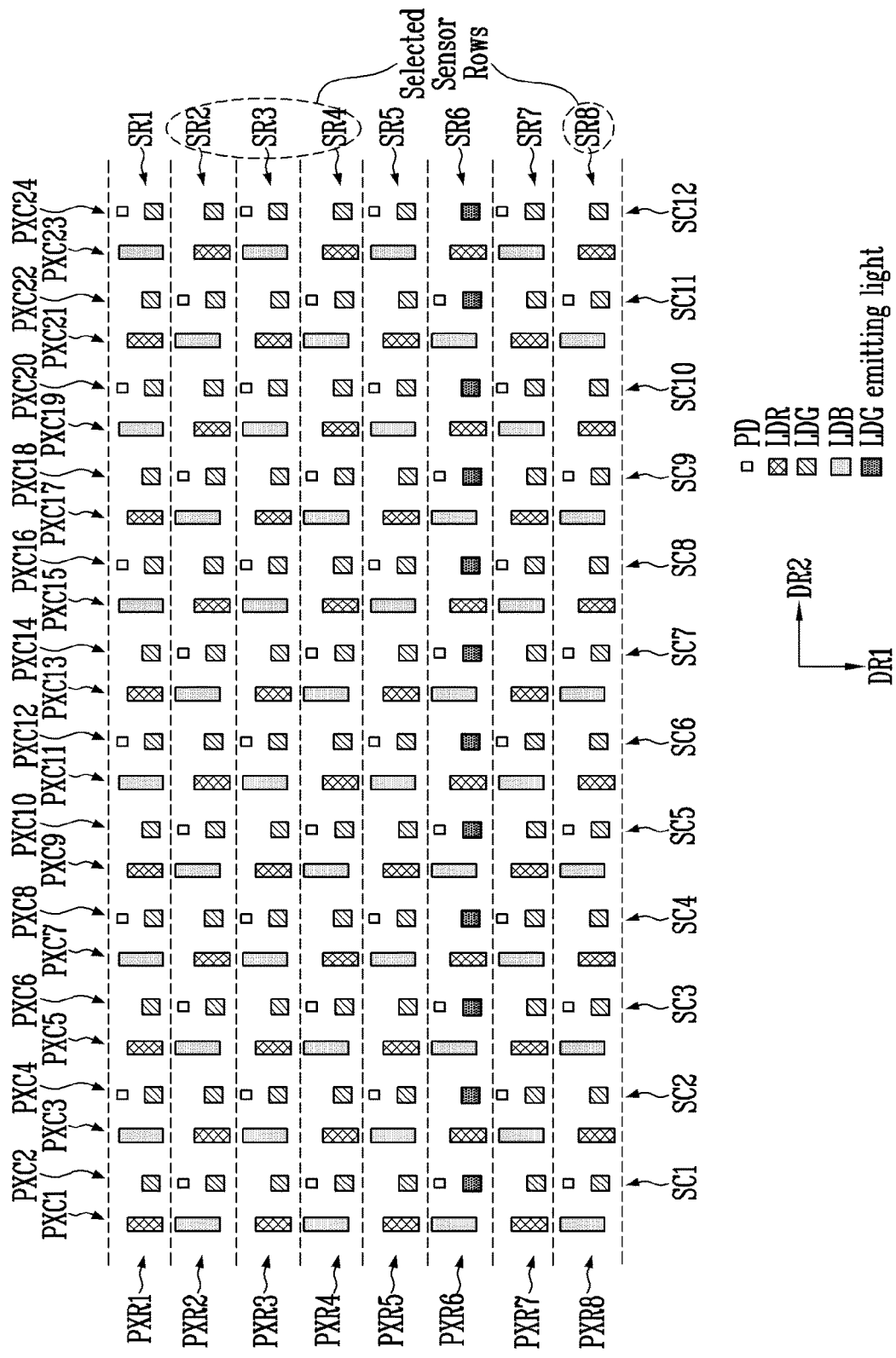
FIGS. 19 and 20 are plan views for describing light emitting elements that generate light, and the sensors used to generate fingerprint data when the light emitting elements emit light, in accordance with the arrangement relationships of FIGS. 17 and 18 according to some embodiments of the present disclosure.
Figure 20:
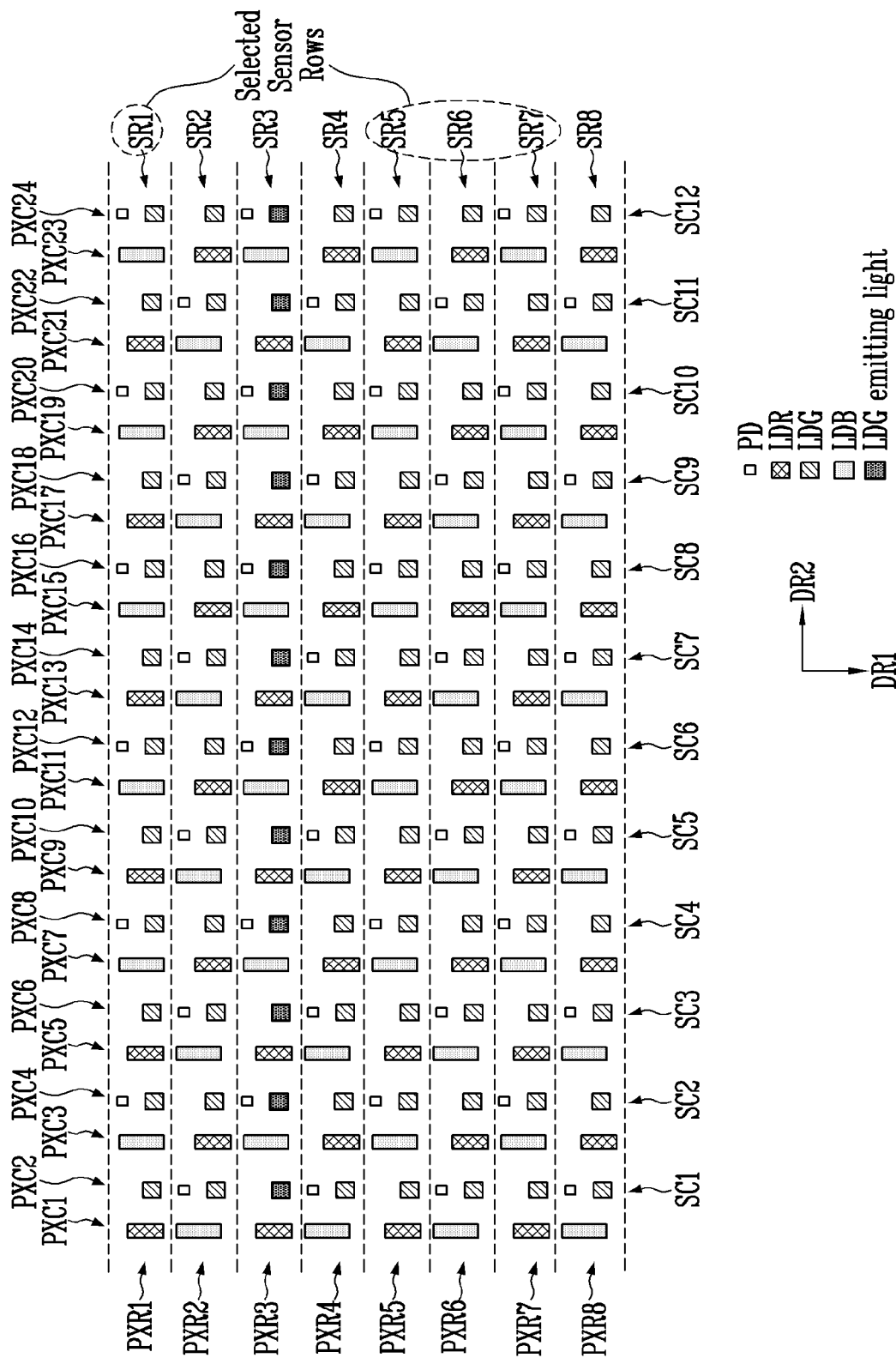

FIGS. 19 and 20 are plan views for describing light emitting elements that generate light, and the sensors used to generate fingerprint data when the light emitting elements emit light, in accordance with the arrangement relationships of FIGS. 17 and 18.

Referring to FIG. 19, red light emitting elements LDR, green light emitting elements LDG, blue light emitting elements LDB, and light receiving elements PD may be arranged in the same manner as that of FIG. 11. Hereinafter, repetitive explanations will be omitted.

The green light emitting elements LDG of the sixth pixel row PXR6 may emit light. The other pixel rows PXR1 to PXR5, PXR7, and PXR8 are inhibited from emitting light. The red light emitting elements LDR and the blue light emitting elements LDB are inhibited from emitting light.

Sensor rows spaced apart from the sixth pixel row PXR6 may be selected. For example, the second to fourth sensor rows SR2 to SR4 and the eighth sensor SR8 may be selected. A first sensing data set may be obtained from the selected sensor rows SR2 to SR4 and SR8.

Referring to FIG. 20, the green light emitting elements LDG of the third pixel row PXR3 may emit light. The other pixel rows PXR1, PXR2, and PXR4 to PXR8 are inhibited from emitting light. The red light emitting elements LDR and the blue light emitting elements LDB are inhibited from emitting light.

Sensor rows spaced apart from the third pixel row PXR3 may be selected. The foregoing sensor rows may be sensor rows unselected when the first sensing data set is obtained. For example, the first sensor row SR1 and the fifth to seventh sensor rows SR5 to SR7 may be selected. A second sensing data set may be obtained from the selected sensor rows SR1 to SR5 to SR7.

Subsequently, fingerprint data may be generated based on the first and second sensing data sets.

Figure 21:
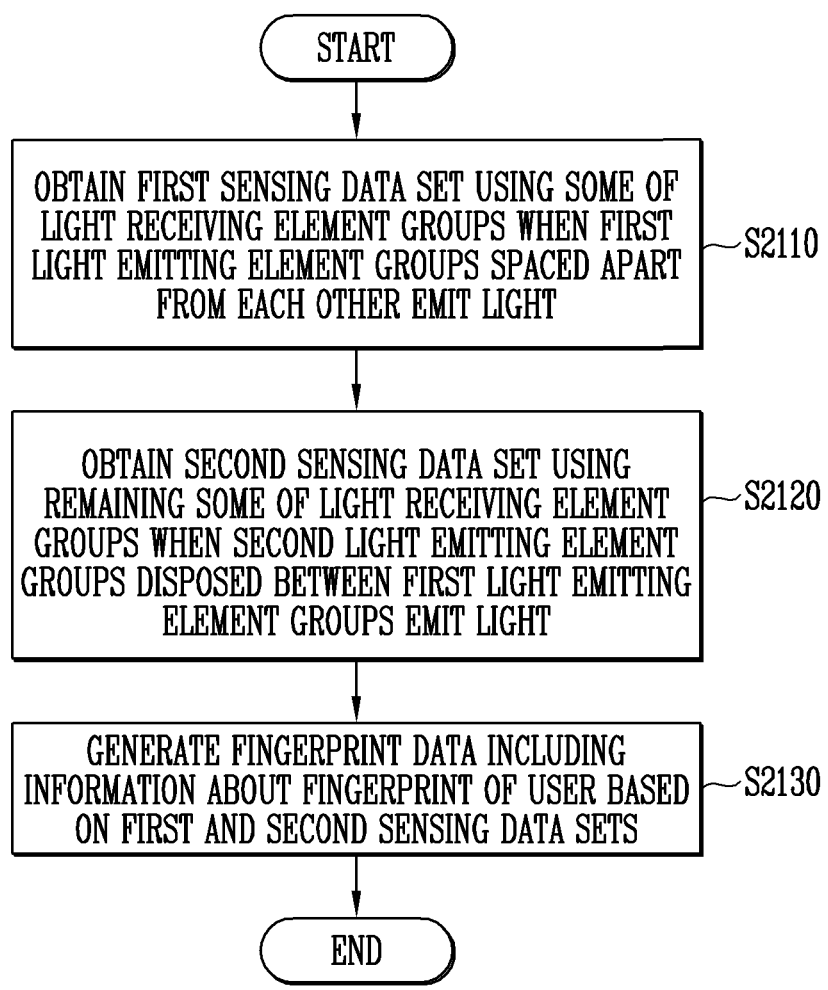
FIG. 21 is a flowchart showing a method of generating fingerprint data in according to some embodiments of the present disclosure.

FIG. 21 is a flowchart showing a method of generating fingerprint data in accordance with some embodiments of the present disclosure.

Referring to FIG. 21, at operation S2110, first light emitting element groups spaced apart from each other emit light, and a first sensing data set is obtained using some light receiving element groups spaced apart from the first light emitting element groups among the light receiving element groups.

According to some embodiments, the first light emitting element groups may be first green pixel columns among the green pixel columns of the display panel DP of FIG. 3, so that the first green pixel columns may emit light. According to some embodiments, the first light emitting element groups may be first pixel rows among the pixel rows of the display panel DP, so that the green light emitting elements of the first pixel rows may emit light.

At operation S2120, second light emitting element groups located between the first light emitting element groups emit light, and a second sensing data set is obtained using the other some of the light receiving element groups. Here, the light receiving element groups that are used may be spaced from the second light emitting element groups.

According to some embodiments, the second light emitting element groups may be second green pixel columns located between the first green pixel columns among the green pixel columns of the display panel DP, so that the second green pixel columns may emit light. In this case, the first green pixel columns and the second green pixel columns may be alternately arranged. At least one third green pixel column may be located between any one first green pixel column and a second green pixel column adjacent thereto. According to some embodiments, the second light emitting element groups may be second pixel rows located between the first pixel rows among the pixel rows of the display panel DP, so that the green light emitting elements of the second pixel rows may emit light. In this case, the first pixel rows and the second pixel rows may be alternately arranged. At least one third pixel row may be located between any one first pixel row and a second pixel row adjacent thereto.

At operation S2130, fingerprint data including information about the fingerprint of the user is generated based on the first and second sensing data sets.

Figure 22:
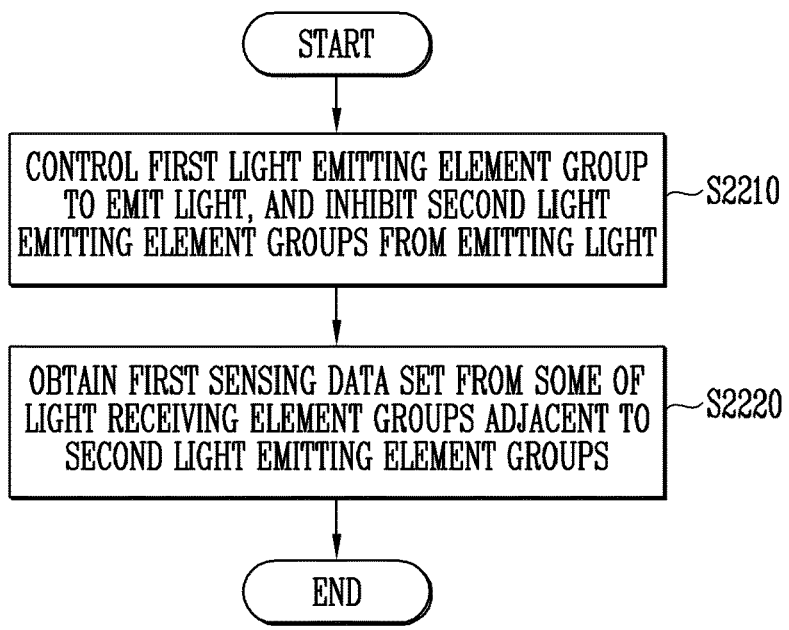
FIG. 22 is a flowchart illustrating further details of the operation S2110 of FIG. 21 according to some embodiments of the present disclosure.

FIG. 22 is a flowchart illustrating aspects of the operation S2110 of FIG. 21 according to some embodiments.

Referring to FIG. 22, at operation S2210, if the first light emitting element groups emit light, the second light emitting element groups are inhibited from emitting light. At operation S2220, the first sensing data set is obtained using some of the light receiving element groups adjacent to the second light emitting element groups.

Figure 23:
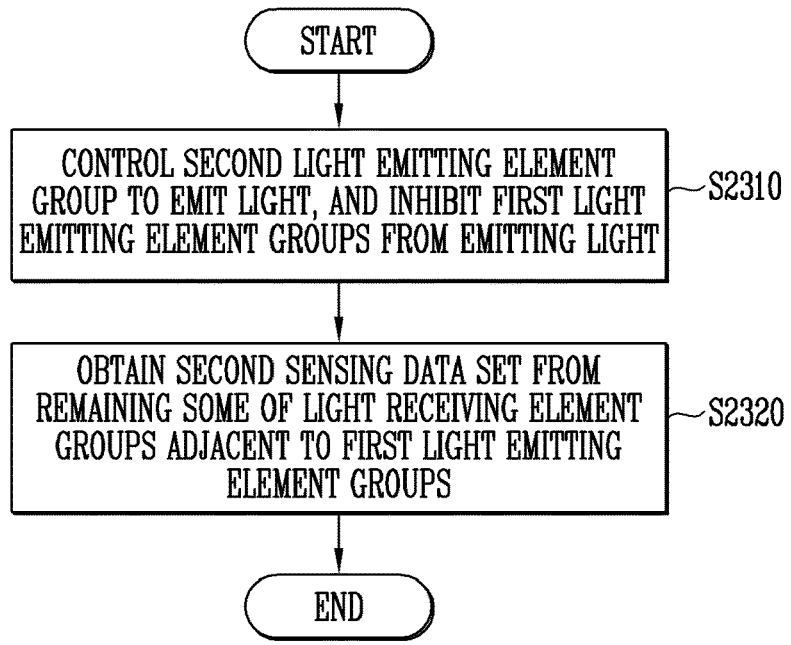
FIG. 23 is a flowchart illustrating further details of the operation S2120 of FIG. 21 according to some embodiments of the present disclosure.

FIG. 23 is a flowchart illustrating aspects of an operation S2120 of FIG. 21 according to some embodiments.

Referring to FIG. 23, at operation S2310, if the second light emitting element groups emit light, the first light emitting element groups are inhibited from emitting light. At operation S2320, the second sensing data set is obtained using the other some of the light receiving element groups adjacent to the first light emitting element groups.

Various embodiments of the present disclosure may provide a display device capable of obtaining biometric information of a user with relatively enhanced reliability, and a method of operating the display device.

The effects of the present disclosure are not limited by the foregoing, and other various effects are anticipated herein.

Although aspects of some embodiments and implementations have been described herein, other embodiments and modifications will be apparent from the foregoing description. Accordingly, the concepts of the present disclosure are not limited to the foregoing embodiments, but rather to the broader scope of the presented claims, and their equivalents, and various obvious modifications and equivalent arrangements.

What is claimed is:
1. A display device, comprising:
a base;
light emitting element groups on one surface of the base, and each including a plurality of light emitting elements arranged in columns aligned along a first direction; and
light receiving element groups on the one surface of the base, and each including a plurality of light receiving elements arranged in columns aligned along the first direction, wherein the columns of the light receiving element groups are arranged along the first direction with corresponding ones of the columns of the light emitting element groups and the light receiving elements are spaced apart from the light emitting elements of corresponding columns in a plan view,
wherein the light emitting element groups are arranged in a second direction intersecting the first direction and configured to emit a same color of light,
wherein the light receiving element groups are respectively adjacent and parallel to the light emitting element groups, and
wherein, based on a first light emitting element group among the light emitting element groups emitting light, first sensing data is obtained, without emission of a second light emitting element group in the second direction from the first light emitting element group, the first sensing data obtained via at least one first light receiving element group adjacent to the second light emitting element group among the light receiving element groups, and
wherein the first sensing data is determined based on sensing signals from the first light receiving element group without sensing signals from a second light receiving element group among the light receiving element groups, the second light receiving element group being closest to the first light emitting element group among the light receiving element groups.

2. The display device according to claim 1, wherein, based on the first light emitting element group emitting light, a third light emitting element group between the first and the second light emitting element groups among the light emitting element groups is configured to not emit light.

3. The display device according to claim 2, wherein, based on the first light emitting element group emitting light, the first sensing data is obtained by further using a third light receiving element group adjacent to the third light emitting element group.

4. The display device according to claim 1, wherein, based on the first light emitting element group emitting light, the first sensing data is obtained, without emission of two or more third light emitting element groups between the first and the second light emitting element groups among the light emitting element groups, by further using at least one third light receiving element group adjacent to the third light emitting element groups.

5. The display device according to claim 1, wherein, based on the first light emitting element group emitting light, a third light emitting element group spaced apart in the second direction from the second light emitting element group among the light emitting element groups is controlled to emit light.

6. The display device according to claim 5, wherein, based on the first and the third light emitting element groups emitting light, the first sensing data is obtained, without emission of a fourth light emitting element group arranged in the second direction from the third light emitting element group among the light emitting element groups, by further using at least one third light receiving element group adjacent to the fourth light emitting element group among the light receiving element groups.

7. The display device according to claim 1, wherein, based on the second light emitting element group emitting light, second sensing data is obtained by using the second light receiving element group adjacent to the first light emitting element group without emission of the first light emitting element group.

8. The display device according to claim 7, wherein fingerprint data is generated based on the first sensing data and the second sensing data.

9. The display device according to claim 7, further comprising:
a data driver connected to the plurality of light emitting elements by data lines;
a readout circuit connected to the plurality of light receiving elements by readout lines; and
a controller configured to control the data driver and to obtain the first sensing data and the second sensing data through the readout circuit.

10. The display device according to claim 1, wherein the at least one first light receiving element group includes a third light receiving element group arranged adjacent and parallel to the second light emitting element group among the light receiving element groups.

11. The display device according to claim 1,
wherein the light emitting element groups are respectively in pixel column areas extending in the first direction, and
wherein the light receiving element groups overlap the pixel column areas.

12. The display device according to claim 1,
wherein the plurality of light emitting elements include organic light emitting diodes, and
wherein the plurality of light receiving elements include organic photodiodes.

13. A method of driving a display panel comprising light emitting element groups each including a plurality of light emitting elements arranged in columns aligned along a first direction, and light receiving groups each including a plurality of light receiving elements arranged in columns aligned along the first direction, wherein the columns of the light receiving element groups overlap corresponding ones of the columns of the light emitting element groups and the light receiving elements are spaced apart from the light emitting elements of corresponding columns in a plan view, and the light emitting element groups are configured to emit a same color of light, the method comprising:
allowing first light emitting element groups spaced apart from each other in a second direction intersecting the first direction among the light emitting element groups to emit light when inhibiting second light emitting element groups between the first light emitting element groups among the light emitting element groups from emitting light;
obtaining first sensing data using first light receiving element groups adjacent to the second light emitting element groups among the light receiving element groups without sensing signals from second light receiving element groups among the light receiving element groups based on the first light emitting groups emitting light, the second light receiving element groups being closest to the first light emitting element groups, respectively, among the light receiving element groups; and
generating fingerprint data based on the first sensing data.

14. The method according to claim 13, wherein the first light emitting element groups and the second light emitting element groups are alternately arranged.

15. The method according to claim 13, further comprising:
allowing the second light emitting element groups to emit light when inhibiting the first light emitting element groups from emitting light; and
obtaining second sensing data using second light receiving element groups adjacent to the first light emitting element groups among the light receiving element groups without sensing signals from the first light receiving element groups based on the second light emitting groups emitting light.

16. The method according to claim 15, wherein generating the fingerprint data comprises generating the fingerprint data further based on the second sensing data.

17. A display device, comprising:
a base;
light emitting element groups on one surface of the base, and each including a plurality of light emitting elements arranged in columns aligned along a first direction; and
light receiving element groups on the one surface of the base, and each including a plurality of light receiving elements arranged in columns aligned along the first direction, wherein the columns of the light receiving element groups overlap corresponding ones of the columns of the light emitting element groups and the light receiving elements are spaced apart from the light emitting elements of corresponding columns in a plan view,
wherein the light emitting element groups are arranged in a second direction intersecting the first direction and configured to emit a same color of light, wherein the light receiving element groups are respectively adjacent and parallel to the light emitting element groups, and wherein, based on first light emitting element groups spaced apart from each other among the light emitting element groups emitting light, first sensing data is obtained, without emission of second light emitting element groups between the first light emitting element groups among the light emitting element groups, by using first light receiving element groups adjacent to the second light emitting element groups among the light receiving element groups without sensing signals from second light receiving element groups among the light receiving element groups, the second light receiving element groups being closest to the first light emitting element groups, respectively, among the light receiving element groups.

18. The display device according to claim 17, wherein the first light emitting element groups and the second light emitting element groups are alternately arranged.

19. The display device according to claim 17, wherein, based on the second light emitting element groups emitting light, the first light emitting element groups are configured to not emit light, and second sensing data is obtained by using the second light receiving element groups adjacent to the first light emitting element groups without sensing signals from the first light receiving element groups.

20. The display device according to claim 19, wherein fingerprint data is generated based on the first sensing data and the second sensing data.

* * * * *